United States Patent [19]
Yano et al.

[11] Patent Number: 6,075,894
[45] Date of Patent: Jun. 13, 2000

[54] HIGH-QUALITY EDGE-SMOOTHING BASED UPON A DETERMINATION OF CONSECUTIVE BLACK DOTS

[75] Inventors: Kentaro Yano; Naoji Ohtsuka, both of Yokohama; Osamu Iwasaki, Kawasaki; Takahiro Matsuura; Daigoro Kanematsu, both of Yokohama, all of Japan

[73] Assignee: Canon Kabushiki Kaisha, Tokyo, Japan

[21] Appl. No.: 08/977,735

[22] Filed: Nov. 25, 1997

Related U.S. Application Data

[63] Continuation of application No. 08/348,079, Nov. 23, 1994, abandoned.

[30] Foreign Application Priority Data

| | | | |
|---|---|---|---|
| Nov. 30, 1993 | [JP] | Japan | 5-299309 |
| Nov. 30, 1993 | [JP] | Japan | 5-299310 |

[51] Int. Cl.$^7$ ......................................................... G06K 9/36
[52] U.S. Cl. ............................................. 382/199; 382/269
[58] Field of Search .................................. 382/266, 267, 382/254, 194, 199, 258, 269

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,589,139 | 5/1986 | Hada et al. | 382/144 |
| 4,608,577 | 8/1986 | Hori | 346/140 R |
| 4,646,355 | 2/1987 | Petrick et al. | 382/266 |
| 4,723,129 | 2/1988 | Endo et al. | 346/1.1 |
| 4,740,796 | 4/1988 | Endo et al. | 346/1.1 |
| 5,077,679 | 12/1991 | Williamson et al. | 395/105 |
| 5,222,208 | 6/1993 | Matsuhira | 395/150 |
| 5,271,064 | 12/1993 | Dhawan et al. | 382/266 |
| 5,287,419 | 2/1994 | Sato et al. | 382/252 |
| 5,321,430 | 6/1994 | Barnstead et al. | 346/108 |
| 5,351,315 | 9/1994 | Ueda etal. | 382/254 |
| 5,381,522 | 1/1995 | Seto et al. | 395/143 |
| 5,555,360 | 9/1996 | Kumazaki et al. | 395/143 |
| 5,751,929 | 5/1998 | Ohnuma et al. | 395/129 |

FOREIGN PATENT DOCUMENTS

| | | | |
|---|---|---|---|
| 54-56847 | 5/1979 | Japan | B41M 5/26 |
| 54-23769 | 8/1979 | Japan | G06K 15/10 |
| 57-2105 | 1/1982 | Japan | B41J 3/10 |
| 59-123670 | 7/1984 | Japan | B41J 3/04 |
| 59-138461 | 8/1984 | Japan | B41J 3/04 |
| 60-71260 | 4/1985 | Japan | B41J 3/04 |
| 60-236362 | 11/1985 | Japan | H04N 1/387 |
| 63-48226 | 9/1988 | Japan | H04N 1/40 |

*Primary Examiner*—Andrew W. Johns
*Attorney, Agent, or Firm*—Fitzpatrick, Cella, Harper & Scinto

[57] ABSTRACT

An image processing method and an apparatus capable of employing the method, which smooth notches on outlines and output an image of high quality having smooth outlines. First, edges to be smoothed are determined, then numbers of consecutive black dots in the horizontal and vertical directions are counted from originating points in the determined edge. Further, dots for correcting an original image are calculated based on the counted numbers of consecutive black dots. Thereby it is possible to perform the high speed smoothing correction efficiently, facilitating production of a high quality printing apparatus for a reasonable price.

10 Claims, 31 Drawing Sheets

FIG. 6
(1)
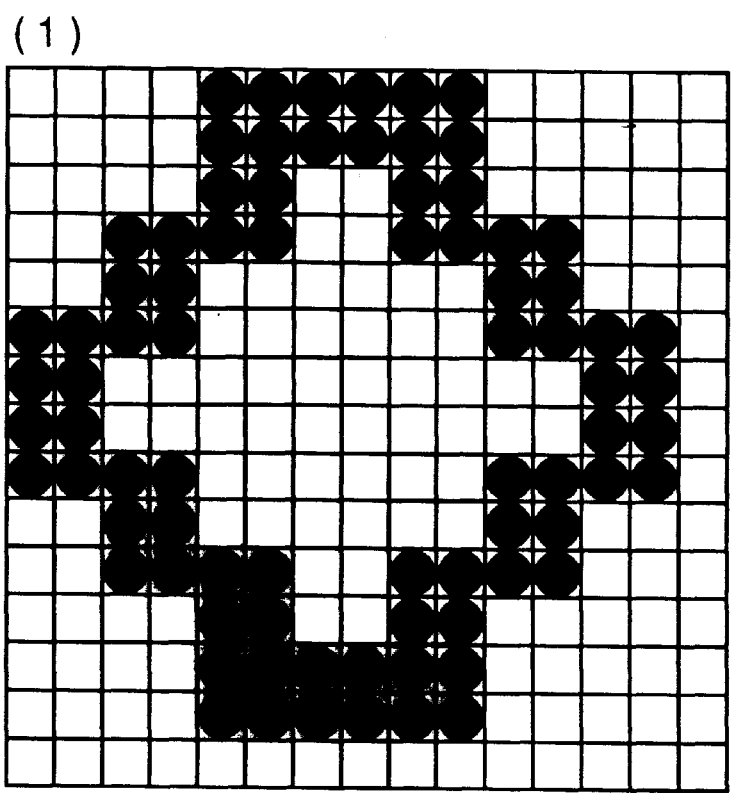
(2)
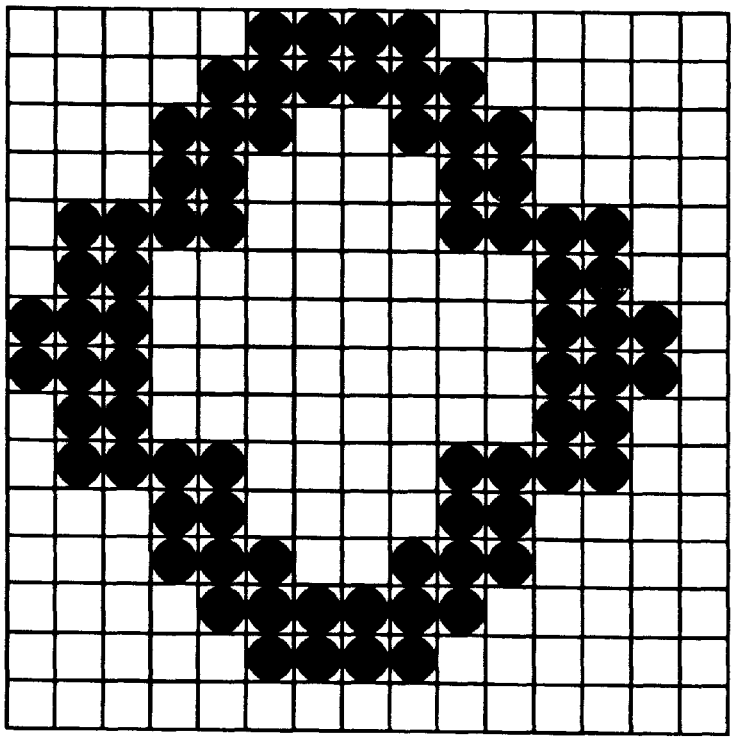

FIG. 7
(1) 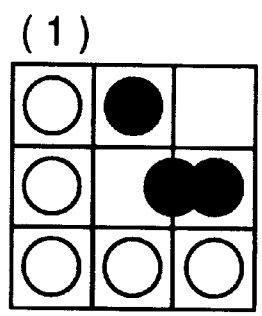
(2) 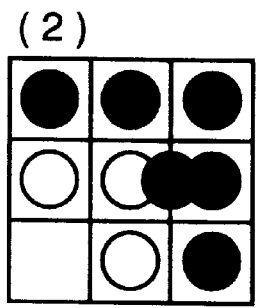
(3) 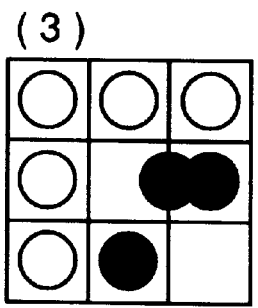
(4) 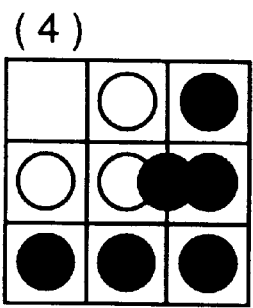
(5) 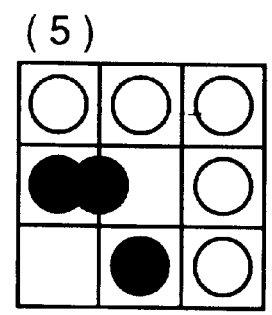
(6) 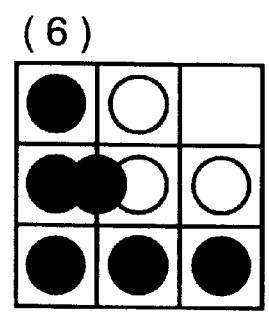
(7) 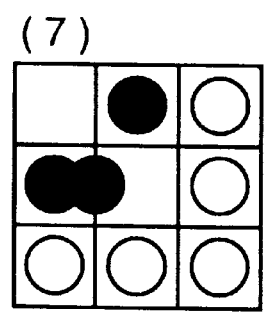
(8) 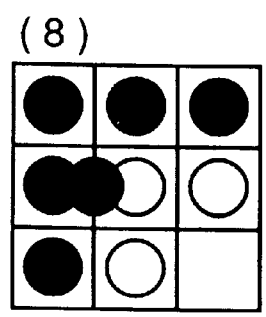

FIG. 8
(1)
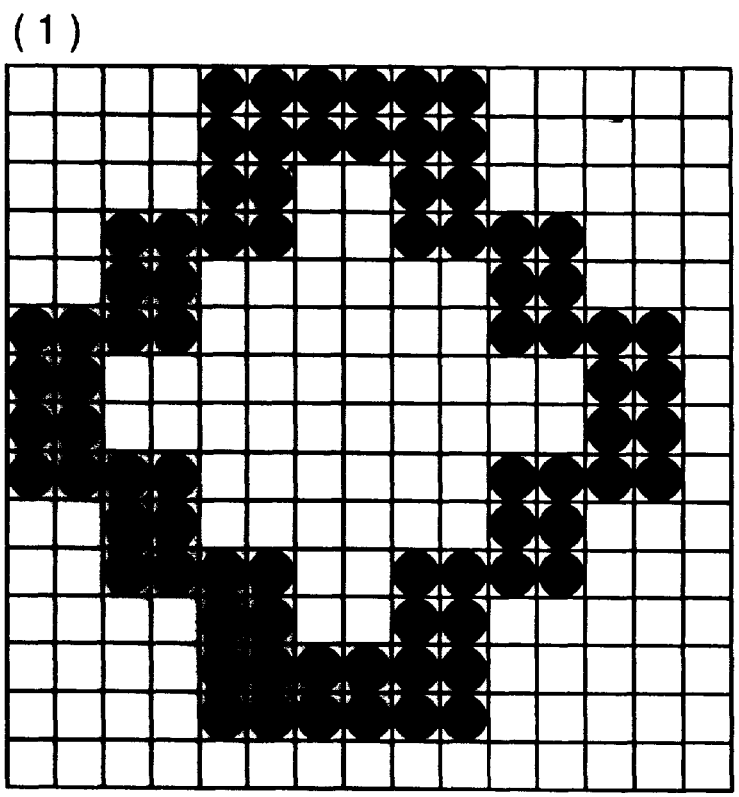
(2)
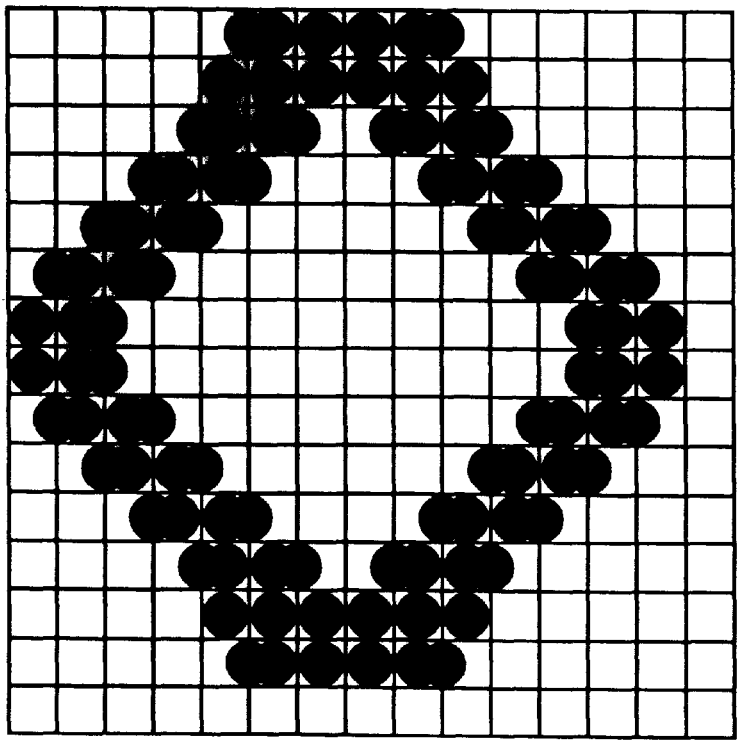

FIG. 22
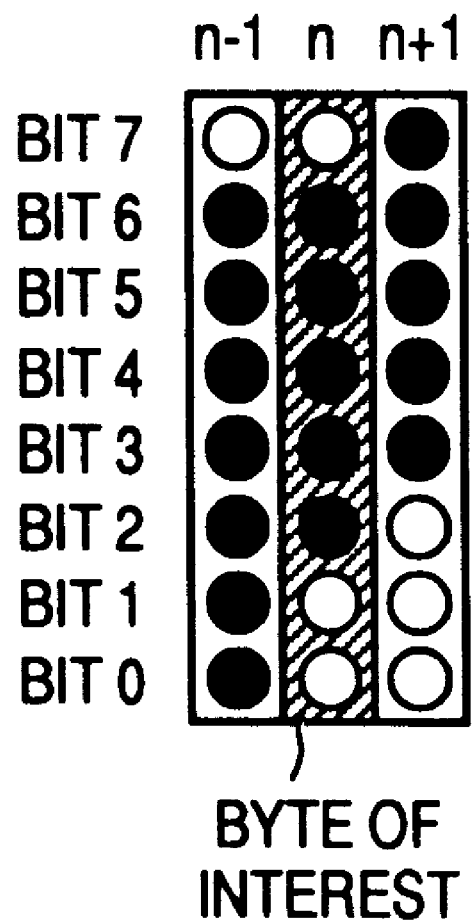
BYTE OF INTEREST
DIRECTION OF EDGE 

FIG. 23
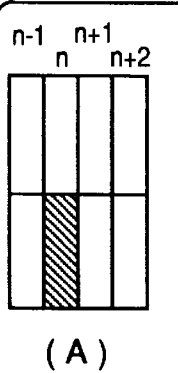
(A)
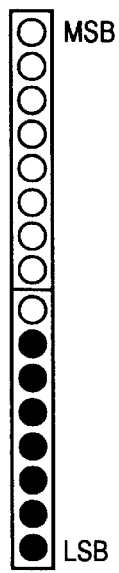
OR OPERATION BETWEEN n-1 AND n
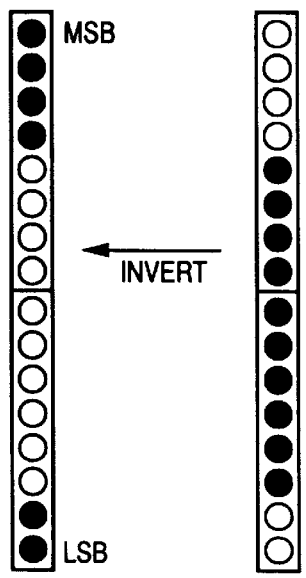
AND OPERATION BETWEEN n+1 AND n+2
← INVERT
X-OR OPERATION
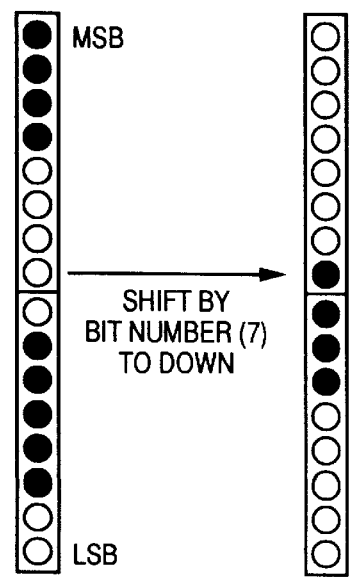
SHIFT BY BIT NUMBER (7) TO DOWN →
FILL BITS LARGER THAN 7 →
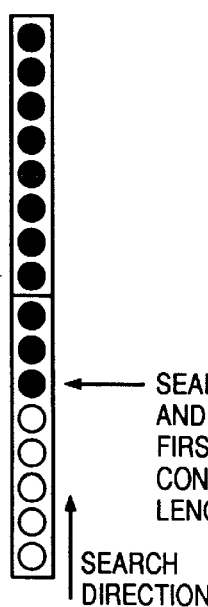
← SEARCHED FROM THE RIGHT AND NUMBER OF BIT WHERE FIRST BLACK DOT APPEARS IS CONSIDERED AS VERTICAL LENGTH IN THIS CASE, 5
↑ SEARCH DIRECTION
(B)

(B)

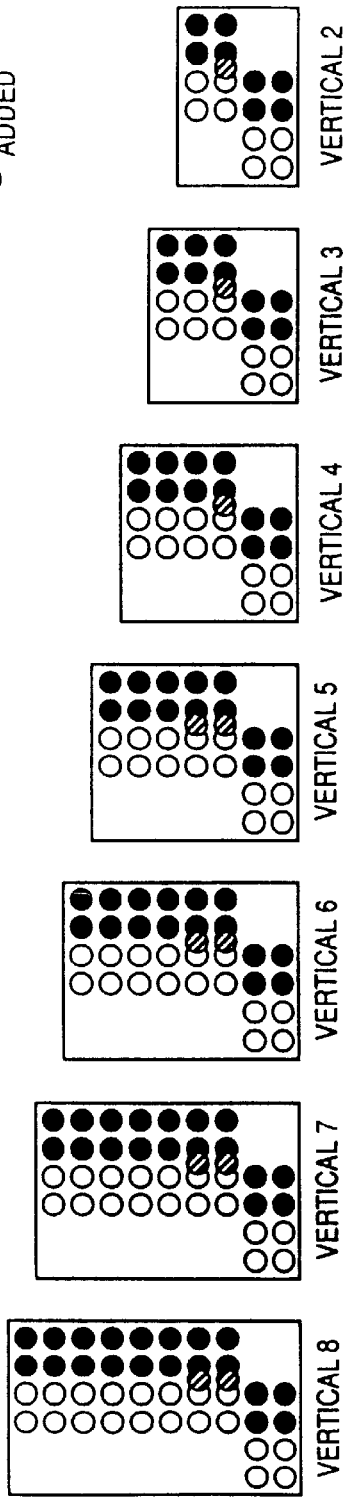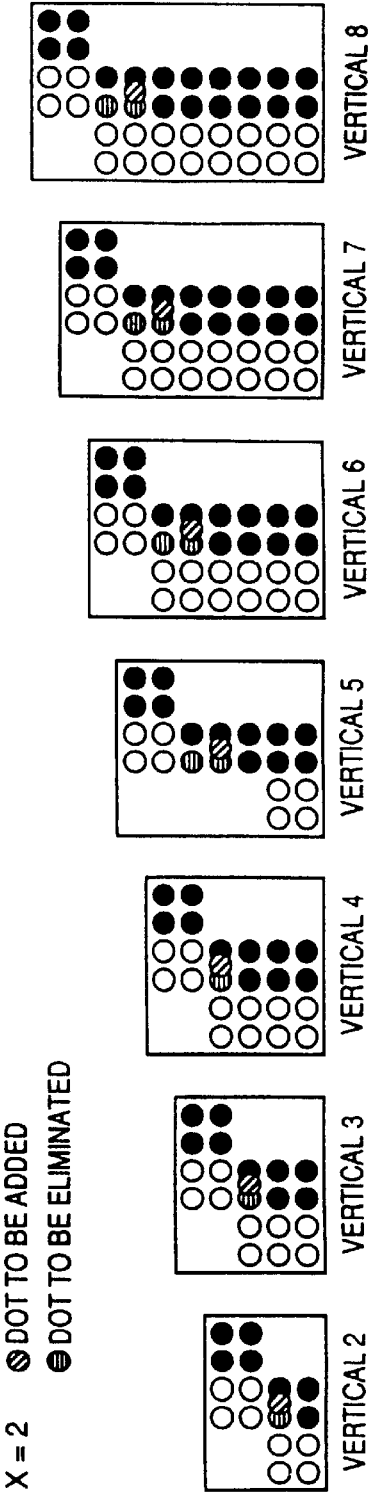

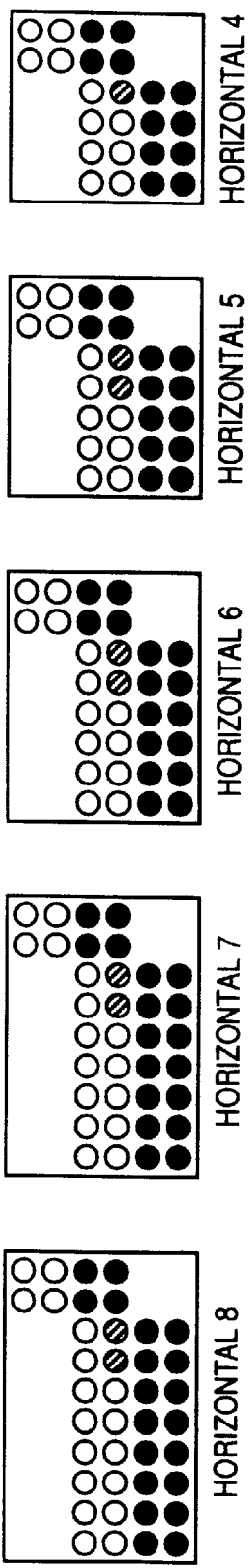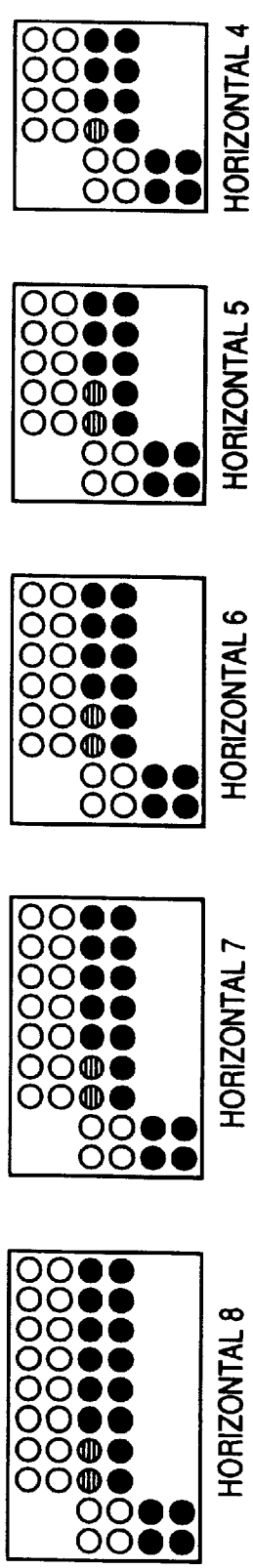

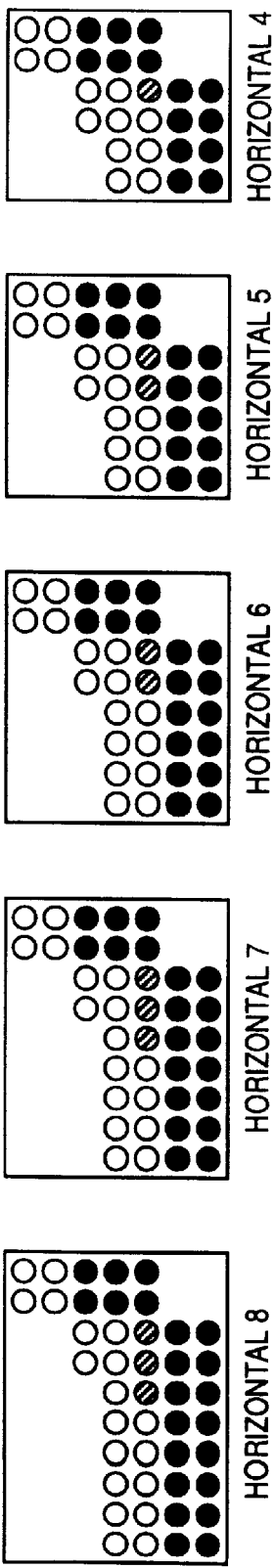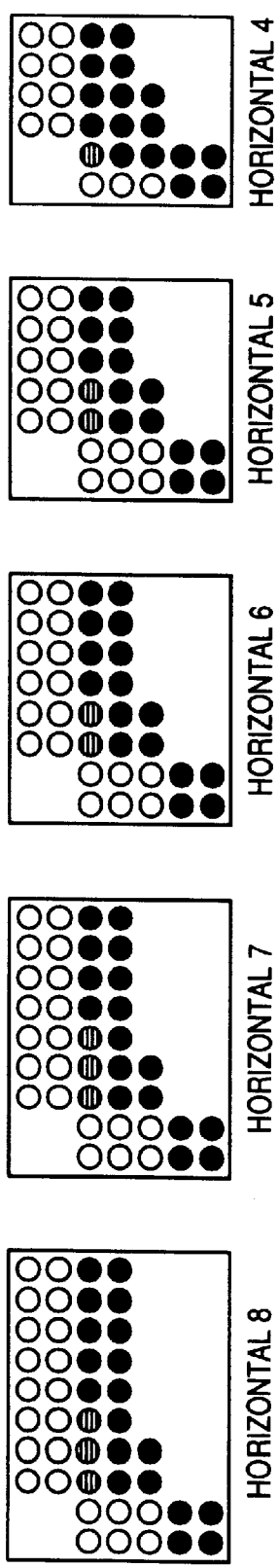

DOT OF INTEREST

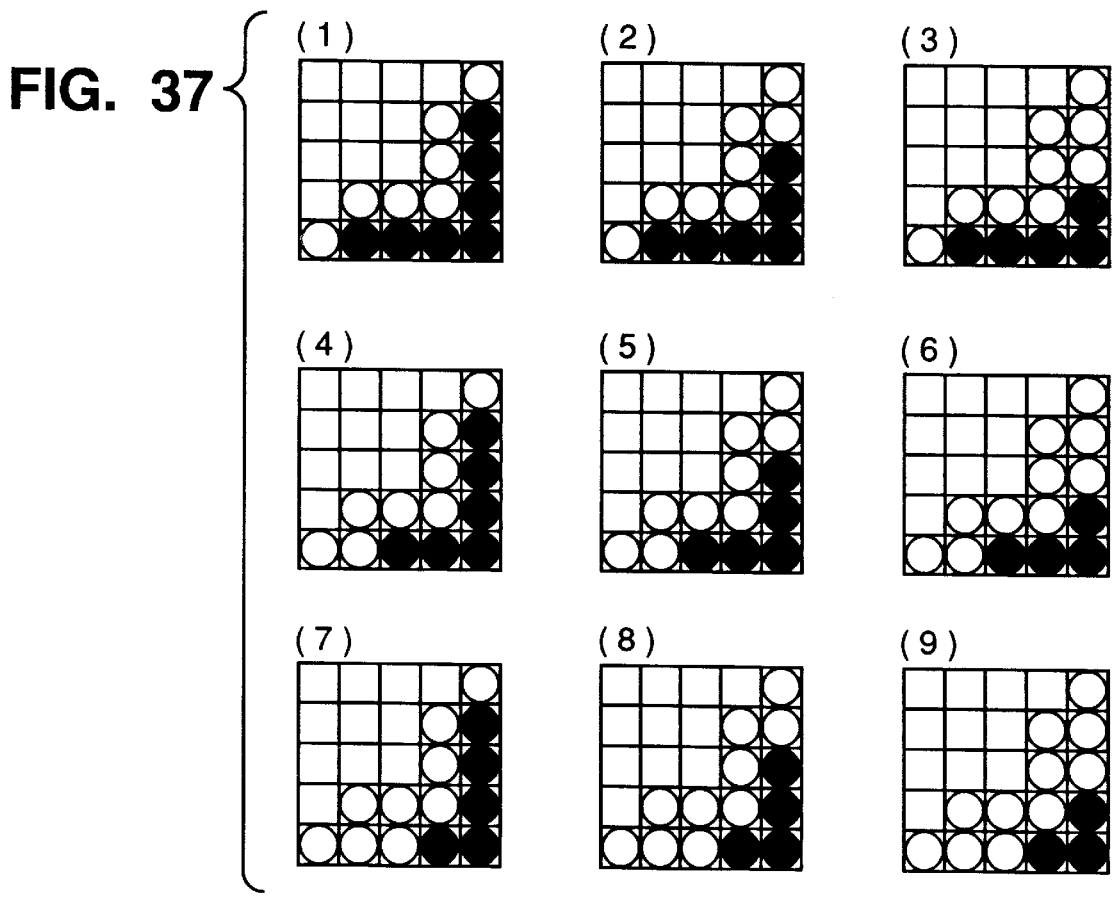

HIGH-QUALITY EDGE-SMOOTHING BASED UPON A DETERMINATION OF CONSECUTIVE BLACK DOTS

This application is a continuation of application Ser. No. 08/348,079 filed Nov. 23, 1994 now abandoned.

BACKGROUND OF THE INVENTION

The present invention relates to an image processing method and apparatus and, more particularly, to an image processing method which identifies edges in an input image and performs smoothing correction on the edges to obtain a high quality image, and which allows the smoothing correction to be done fast and efficiently using an apparatus constructed with simple circuits. The invention also relates to an apparatus capable of employing the method.

Office automation devices, such as personal computers and word processors, have been widely used, and accordingly, there have been developed countless recording methods for printing apparatus to print out information inputted from those office automation devices. Among the recording methods, a dot matrix method, such as the wire dot method, heat transfer method, or ink jet method, is one of the most popular recording methods, since a printer using that method can be constructed at low price and compact size.

However, the dot matrix method to be applied to a printing apparatus forming an image requires dots to form the image, and thus, notches on the outline of an image, especially on slopes of the image, caused by the dot arrangement are problems which may decrease quality of the image. In order to overcome the problem, there exists a smoothing correction method, which identifies notches of an original image by following a predetermined rule, and adds dots to edges where the notches are found in the original image. This process is disclosed in Japanese Patent Publication No. 54-23769, Japanese Patent Publication No. 57-2105, and Japanese Patent Publication No. 60-236362, and will be referred to as "original smoothing correction" hereinafter.

Another method to overcome the problem comprises a process of finding notches in an original image by following a predetermined rule, adding dots on one side of a line where the notches are located, with respect to a scanning direction (e.g., on an outline where non-print dots are converted into print pixels), and eliminating dots on the other side (e.g., on an outline where print dots are converted into non-print dots).

This process is disclosed in Japanese Patent Publication No. 63-48226, and will be referred to as "advanced smoothing correction" hereinafter.

However, in an original smoothing correction which adds dots, lines of images become thick because of the gain of dots. This problem is explained below with reference to FIG. 35.

(1) in FIG. 35 is an original image, and (2) in FIG. 35 is an image resulting from original smoothing correction being applied to the original image. As shown in (2) in FIG. 35, compared to (1) in FIG. 35, notches of the image are smoothed since dots are added at edges. On the other hand, since sixteen dots are added to the image (1) in FIG. 35, the line of the image (2) in FIG. 35 is thicker than in the original image. In order not to thicken lines of an image after smoothing correction is applied, it is necessary to reduce the number of dots to be added in edges between dots, which however prevents the original image from being smoothed. Thus, in original smoothing correction, thickening the lines or reducing the number of dots to be added, is chosen, each however occurring at the expense of the other.

Further, in the above-mentioned advanced smoothing correction according to which dots are added on one side of a line with respect to the scanning direction and eliminated on the other side, the aforesaid problem of thickened lines is improved; however, the shapes of some types of images may become imbalanced.

Generally, an image which requires the smoothing correction contains a slope or slopes in it. Types of slopes in the image can be basically divided into two kinds, namely, a right-rising-slope and a right-falling-slope. In the original image shown in (1) in FIG. 35, parts which require smoothing correction are right-rising-slopes [a] and [d], and right-falling-slopes [b] and [c]. In a case where the advanced smoothing correction is applied to the original image, the advanced smoothing correction applied to the slopes [a] and [d] is the same, and so is the advanced smoothing correction applied to the slopes [b] and [c]. In other words, in the right-rising-slopes [a] and [d] and in the right-falling-slopes [b] and [c], "thickening" correction is performed on the side where the border of the slope changes from white to black, whereas the "thinning" correction is performed on the side where the border of the slope changes from black to white. As a result, slopes [a] and [c] are thickened outside and thinned inside, while on the other hand, slopes [b] and [d] are thinned outside and thickened inside, which is not a desirable smoothing correction.

It is theoretically possible to choose a best smoothing correction which would correct slope [a] and slope [d] differently by detecting that the slopes [a], [b], [c], and [d] are forming one "closed" image (i.e., forming a closed loop); however, this requires complicated processing. Thus, such smoothing correction cannot be adopted in a machine of reasonable price.

All notches in an image can be determined by employing a conventional pattern matching of an edge detecting method; however, this method also requires very complicated processing. Therefore, hardware having a very large capacity is required to adopt this method, and thus the method is only used by costly apparatus.

Conventional smoothing correction method will now be described with reference to the figures.

Notches in a binarized image appear at edges on outlines, namely at right-angled-corner constructed with printing dots. Patterns of a (1×1) pixel edge to a (3×3) pixel edge are shown in FIG. 37 as examples. In FIG. 37, (1) is a pattern having a (3×3) edge; (2), a (2×3) edge; (3), a (1×3) edge; (4), a (3×2) edge; (5), a (2×2) edge; (6), a (1×2) edge; (7), a (3×1) edge; (8), a (2×1) edge; and (9), a (1×1) edge.

In order to correct an original image by determining (identifying) edges of up to (3×3) size as in the above description and reduce the notches at each edge, the nine patterns shown in FIG. 37 and additional patterns obtained by rotating the nine patterns by 90 degrees, by 180 degrees, and 270 degrees, which added up to a total of thirty-six patterns (nine patterns * 4), have to be compared with the original image.

If recording resolution of a printing apparatus is 360 DPI (dots/inch), then the number of dots which would fill a record medium of A4 size is over 10,000,000 pixels. To compare images, all the matching patterns have to be compared to all the pixels in the record area of the record medium, shifting pixel by pixel in both horizontal and vertical directions. Therefore, the comparing operation has to be repeated more than 360 million times to print on the A4 sized printing medium.

Further, as edges as small as 1 mm are desired to be smoothed by using the aforesaid apparatus of 360 DPI resolution, to correct the above nine edge sizes is not enough, but edges up to (14×14) have to be determined. For determining the (1×1) edges to the (14×14) edges, the number of matching pattern required is seven-hundred and eighty-four (784), whereas thirty-six (36) patterns are required for correcting up to (3×3) edges. Thus, if the pattern size of the matching pattern increases in order to reduce the notches of an image to produce a high quality image, the capacity required to perform the process increases enormously.

In addition, a user looks for a printing apparatus which performs high speed and high quality printing, and also is low in price. Therefore, a smoothing correction method which can be employed by such low priced apparatus is strongly desired.

SUMMARY OF THE INVENTION

The present invention has been made in consideration of the above situation, and has as its object to provide an image processing method and low priced apparatus capable of employing a method which enables one to reduce notches of outlines, which is the main problem of the dot matrix recording method, and output a high quality image having smooth outlines at high speed by employing a smoothing correction method having much smaller number of processes than the conventional smoothing correction methods. According to the present invention, the foregoing object is attained by providing an image processing apparatus comprising: input means for inputting image data; first edge determining means for determining an edge in the inputted image data; second edge determining means for determining status of the edge determined by said first edge determining means; and smoothing means for performing smoothing correction on the inputted image data in accordance with the determined result by said second edge determining means.

Another object of the present invention is to provide an image processing method and apparatus capable of employing a method which enables one to reduce notches on outlines and output a high quality image having smooth outlines by correcting thickness and imbalance of the smoothed image. Thus, the foregoing object is attained by providing an image processing apparatus comprising: input means for inputting image data; determining means for determining edges in the inputted image data; and smoothing means for smoothing the edges determined by said determining means by applying a thinning process and a thickening process, wherein said smoothing means controls positions where either the thinning or the thickening process is applied depending on the direction of the edge.

Further, another object of the present invention is to provide an image processing method and apparatus capable of employing the method which enables one to smooth an image without thickening the image by addition and elimination of dots to/from a slope.

Furthermore, another object of the present invention is to provide an image processing method and apparatus capable of employing the method which enables one to determine corners, determine the number of consecutive black dots in both the horizontal and vertical directions comprising the corner, and perform smoothing correction in accordance with the determined number of consecutive black dots.

Further, another object of the present invention is to provide an image processing method and apparatus capable of employing a method which enables one to determine corners, determine numbers of consecutive black dots in both the horizontal and vertical directions comprising the corner by performing a logical operation, accessing a table in correspondence with the determined number of consecutive black dots, and performing smoothing correction on the edges composed of a plurality of dots in a lump. Compared to the conventional methods and apparatus which perform the smoothing correction by determining edges by shifting one bit at a time, the smoothing correction according to the present invention can be performed efficiently and at high speed, and can be employed by an apparatus of rather simple construction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows bit patterns before and after smoothing correction according to the first embodiment;

FIG. 7 shows bit patterns after smoothing correction according to a second embodiment of the present invention;

FIG. 8 illustrates bit patterns before and after smoothing correction according to the second embodiment;

FIGS. 21 and 22 explain a process of determining corners according to the seventh embodiment;

FIGS. 23 and 24 explain a process of determining a number of successive dots according to the seventh embodiment;

FIGS. 29A to 32B illustrate bit map images after smoothing correction according to a seventh embodiment;

FIGS. 35 to 37 are diagrams illustrating conventional smoothing correction.

DETAILED DESCRIPTION OF THE PREFERRED EMBODIMENTS

Preferred embodiments of the present invention will be described in detail in accordance with the accompanying drawings.

[First Embodiment]

In a first embodiment, there is described smoothing correction which adds and eliminates dots on a slope depending on the type of slope, namely either a right-rising-slope or a right-falling-slope, in such manner that an image is not thickened or imbalanced by the smoothing correction.

Figure 1:
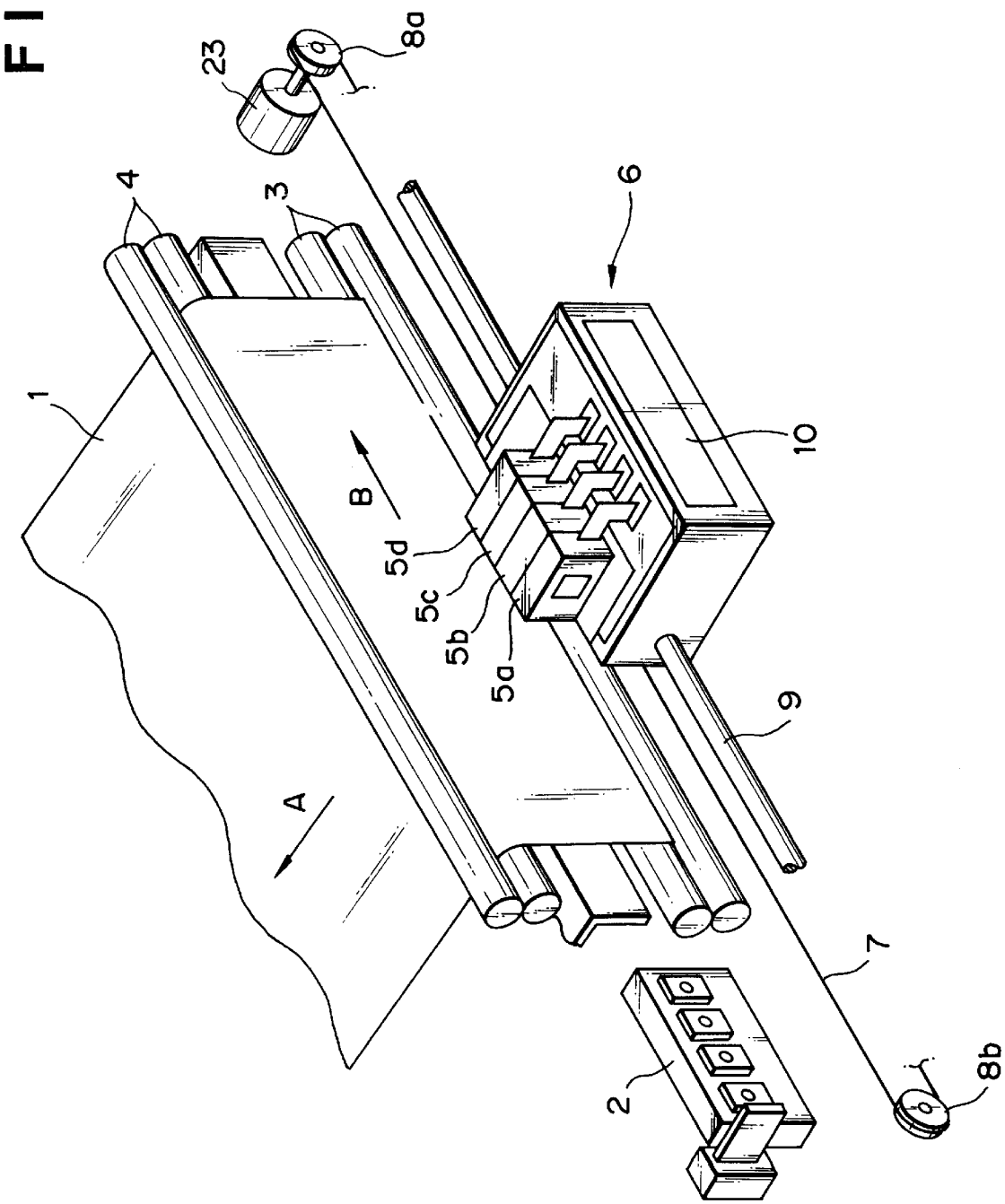
FIG. 1 is an external view of an ink-jet printing apparatus, especially of a recording head of the apparatus, employing an image processing method according to an embodiment of the present invention.

FIG. 1 is an external view of an ink-jet printing apparatus, especially the recording head portion of the apparatus, employing an image processing method according to an embodiment of the present invention. First, a configuration of the printing apparatus will be described with reference to FIG. 1.

In FIG. 1, reference numeral 1 denotes a recording sheet made of paper or plastic, and the sheet is supplied by a paper feed roller (not shown) from a stock of the paper sheets in a cassette or the like one at a time. The fed sheet is placed separately from other sheets at a fixed distance, and conveyed in the direction of arrow A by pairs of first and third, and second and fourth conveying rollers 3, 4 which are driven by respective stepping motors (not shown).

Reference numerals 5a to 5d denote ink-jet type recording heads for recording on the recording sheet 1. Ink is supplied from an ink cartridge 10, and discharged from nozzles in accordance with an image signal. The recording heads 5a to 5d and the ink cartridge 10 are mounted on a carriage 6. The carriage 6 is connected with a carriage motor via a belt 7 and pulleys 8a and 8b. Thus, scanning is performed by driving the carriage 6 along a guide shaft 9 in both directions by a carriage motor 23.

According to the construction as described above, the recording heads 5a to 5d record an image by discharging ink onto the record sheet 1 based on image signals while moving in the direction shown by arrow B. During the recording, the recording heads 5a to 5d move to a home position for cleaning ink from the nozzles of the heads by means of a recovering device 2 when necessary, and the pairs of conveying rollers 3 and 4 feed the record sheet 1 by a line in the A direction. The recording on the paper sheet 1 is continued by repeating the above processes.

A control subsystem for driving each unit of the above-described apparatus will be explained with reference to FIG. 2 below.

The control subsystem of the apparatus according to this embodiment comprises a control unit 20, an interface 21, control panel 22, a driver 27 to drive motors (e.g., a carriage motor 23 for driving a carriage, a paper feed motor 24, a first conveying motor 25 for driving a pair of first conveying rollers, and a second conveying motor 26 for driving a pair of second conveying rollers), a driver 28 for driving recording heads, a timer 30, and a counter 32.

The control unit 20 comprises CPU 20a such as a microprocessor, a ROM 20b storing a control program for the CPU 20a and various kinds of data, and a RAM 20c which is used as a work area for the CPU 20a and which is for temporarily storing the various kinds of data. Information (e.g., character pitch, a kind of character) from the control panel 22 as well as image signals from an external device 29 are inputted to the control unit 20 via the interface 21. The control unit 20 outputs motor driving signals for driving motors 23 to 26 via the interface 21, and controls them via the driver 27. The control unit 20 also outputs image signals and drives the recording heads 5 via the driver 28 by using the image signals.

Information for obtaining a number of times of discharge from each nozzle in a unit time is determined by using the timer 30 and the counter 32, and the determined result is transferred to the control unit 20 via the interface 21.

Since the printing apparatus used in this embodiment is a dot printer, when the conventional smoothing method is adopted, notches will not be smoothed well enough on a slope. Or in a better case, the smoothed image may be thicker compared to the original image, or may not keep the shape of the original image. In this embodiment, those problems are corrected by performing a smoothing method described below.

The smoothing correction of the present invention to reduce the notches will be explained below.

Figure 3:
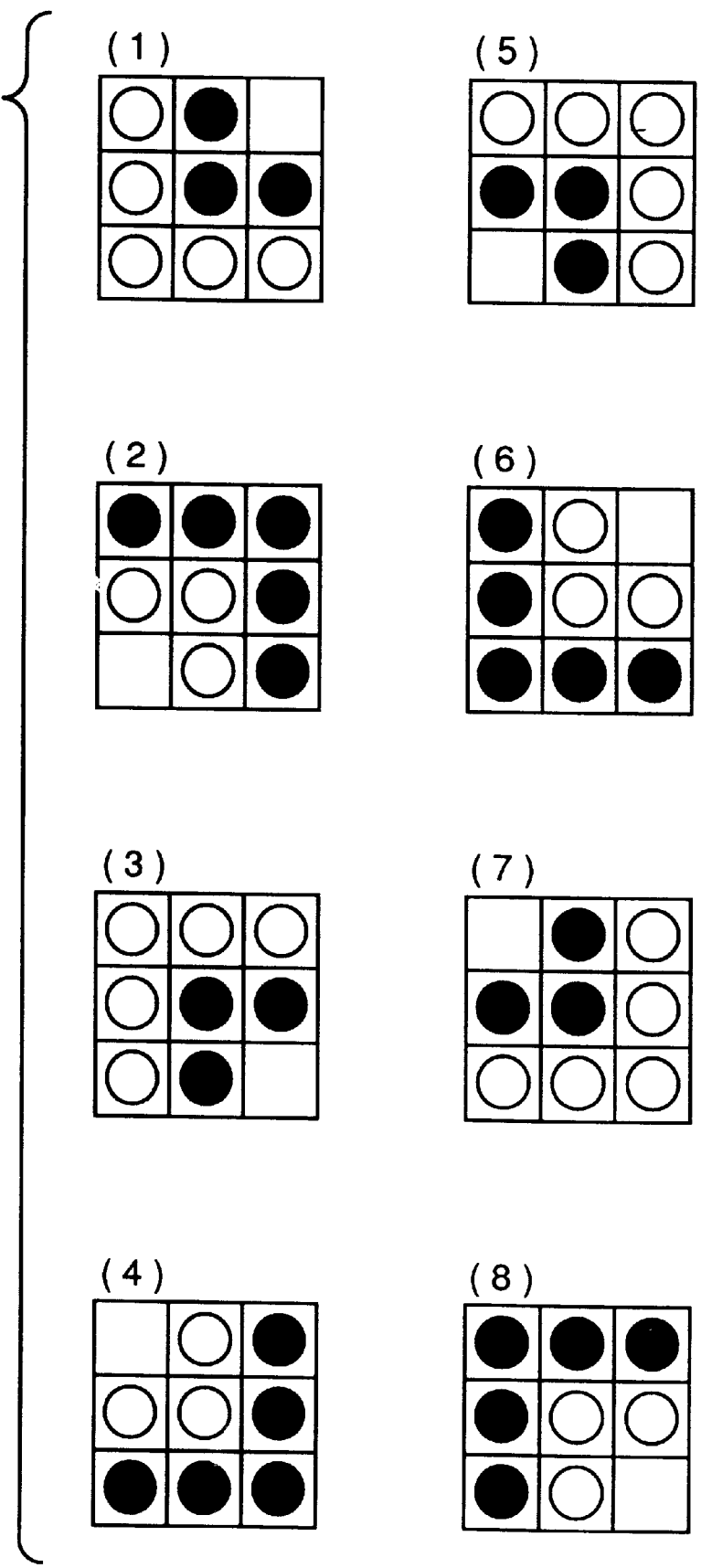
FIG. 3 shows pattern diagrams illustrating matching patterns according to that embodiment.

FIG. 3 illustrates matching patterns used for detecting matching edges, where the smoothing correction needs to apply, in an original image according to this embodiment. In this embodiment, the matching patterns of (3×3) matrixes (1) to (8) in FIG. 3 are compared to the original image one at a time, by the controller 20, and the smoothing correction which is described below is performed when any one of bit patterns in FIG. 3 matches any part of the original image.

Note that, in the matching patterns in FIG. 3, a pixel having a black filled circle dot indicates a pixel for printing, a pixel having a blank circle indicates a dot for non-printing, and a blank square indicates a pixel which can be either for printing or for non-printing. These notations apply to all the figures which appear hereinafter.

Figure 4:
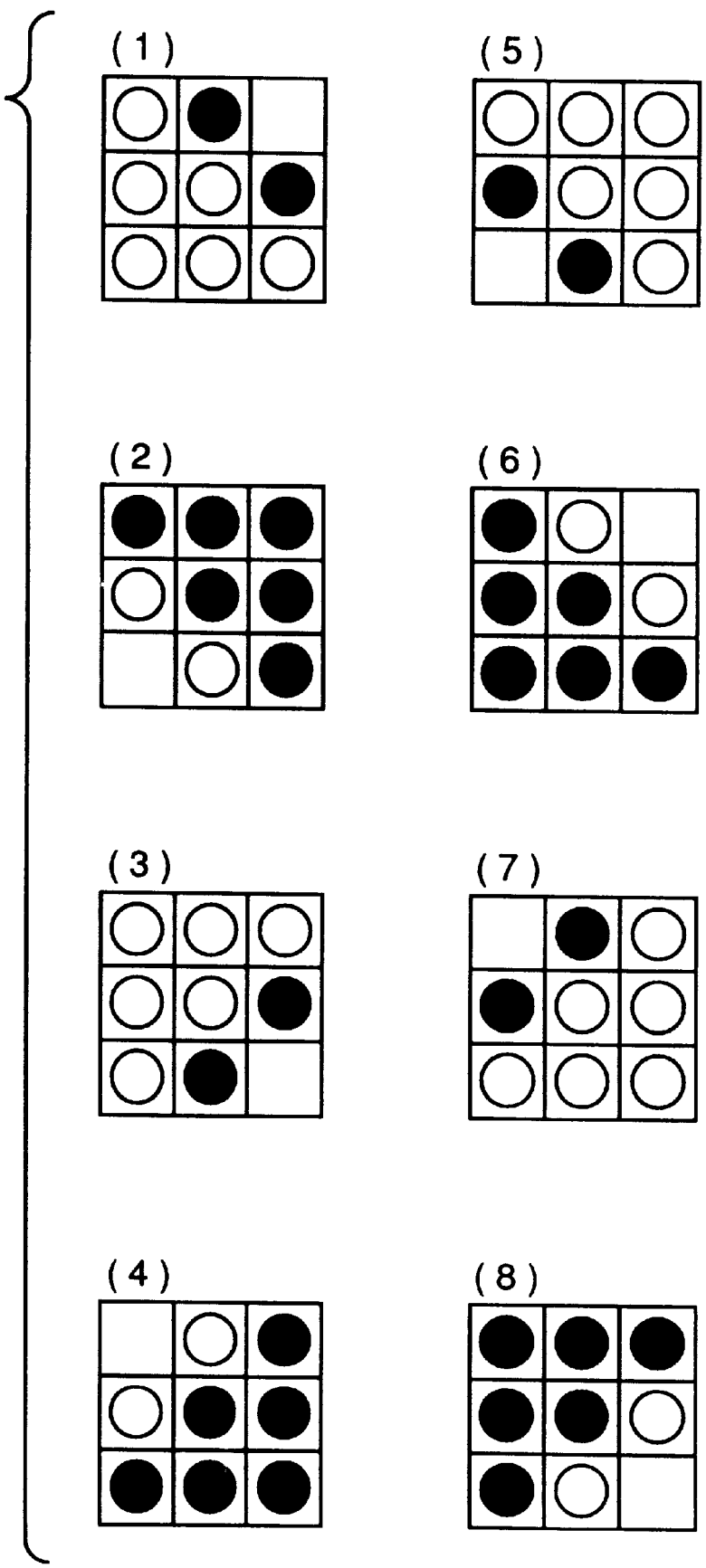
FIG. 4 shows pattern diagrams illustrating bit patterns after smoothing correction according to a first embodiment.

The bit patterns after the smoothing correction of the present embodiment are shown in FIG. 4, (1) to (8). When the original image matches one of the matching patterns (1) to (8) in FIG. 3, dots are added or eliminated to/from the original image so that the corrected image is one of the bit patterns (1) to (8) in FIG. 4. It should be noted that the matching patterns denoted with the same number in the parentheses in FIGS. 3 and 4 correspond to each other. For instance, an original image matched to the matching pattern (1) in FIG. 3 is corrected so that the image has the bit pattern (1) in FIG. 4, an original image matched to the matching pattern (2) in FIG. 3 is corrected so that the image has the bit pattern (2) in FIG. 4, and so on. As seen in FIG. 4, among the eight patterns for smoothing correction as described above, corrections of (2), (4), (6), and (8) in FIGS. 3 and 4 are performed by adding dots, whereas corrections of (1), (3), (5), and (7) in FIGS. 3 and 4 are performed by eliminating dots.

Figure 5:
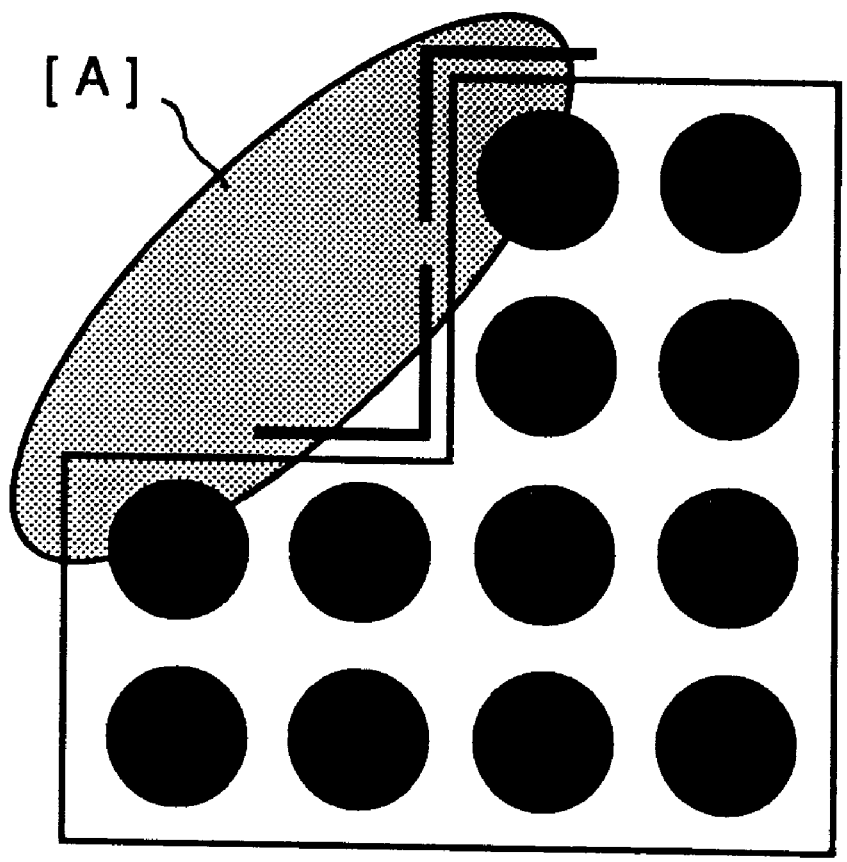
FIG. 5 is an example of a slope in a bit pattern.

FIG. 5 illustrates an example of a part of a slope. The part indicated with [A] in FIG. 5 describes the smallest portion of a right-rising-slope. Every slope is made of an edge of at least one pixel difference, and the edge of one pixel difference matches the matching patterns (3) and (4) in FIG. 3. Then dots are added and eliminated to/from the slope according to the bit patterns (3) and (4) in FIG. 4.

In other words, by performing smoothing correction employing a well-balanced combination of dot addition and elimination to/from edges of at least one pixel difference which make notches, lines are prevented from being thickened, which is a problem of the conventional smoothing correction, and the image after the smoothing correction according to the embodiment is kept in shape, which solve the problem of the advanced smoothing correction.

In FIG. 3, the matching patterns (1) and (2) are for detecting dots to be added and eliminated on one side of a right-falling-slope. Further, the matching patterns (3) and (4) are for detecting dots to be added and eliminated on one side of a right-rising-slope. The matching patterns (5) and (6) are for detecting dots to be added and eliminated on the other side of the right-falling-slope, and the matching patterns (7) and (8) are for detecting dots to be added and eliminated on the other side of the right-rising-slope.

The aforesaid edges where smoothing correction needs to be applied are characterized by combinations of three conditions: (1) either a right-rising-slope or a right-falling-slope, (2) either a border where a non-output pixel (non-print pixel) changes to an output pixel (print pixel) or a border where an output pixel changes to an non-output pixel, and (3) either a position for adding dots or a position for eliminating dots at each border of each side of a slope. Accordingly, the total number of the combination becomes eight (=2×2×2). These edges correspond to matching patterns for determining parts where the smoothing correction needs to be applied, and those are the eight kinds of the matching patterns shown in FIG. 3.

An example of the result of the smoothing correction corrected in accordance with the bit patterns shown in FIG. 4 corresponding to the matching patterns in FIG. 3 is shown in FIG. 6. In FIG. 6, image (1) is an original image and image (2) is after the smoothing correction according to the embodiment is applied to the original image (1). According to the smoothing correction of this embodiment, the lines in the original (1) can be smoothed while keeping lines in about two-dot thickness.

According to the embodiment as described above, it is possible to provide a high quality printing apparatus capable of performing the smoothing correction which allows one to generate an image closer to its original image by providing a smoothing unit for performing both dot addition and elimination, and which operates, at least, either on the border where a non-print dot changes to a print dot or on the border where a print dot changes to a non-print dot.

[Second Embodiment]

Next, a smoothing correction superior to the one in the first embodiment will be described with reference to a second embodiment. In the second embodiment, the basic structure of the printing apparatus is the same as the one described in the first embodiment with reference to FIGS. 1 and 2. Therefore, the explanation below is only on structure and operation different from the printing apparatus in the first embodiment, and description of the same or similar structure and operation as/to those of the printing apparatus in the first embodiment is omitted.

In the first embodiment, the addition of dots to the original image is based on the resolution of the original image, namely 360 DPI, whereas in the second embodiment, the addition of dots is performed on doubled resolution image, having twice the resolution in the first embodiment, namely 720 DPI, in the horizontal direction.

In the second embodiment, edges to be smoothed are determined by using the matching patterns shown in FIG. 3, and the determining process is the same as in the first embodiment. In a case where any part matches one of the matching patterns shown in FIG. 3, dots are either added or moved to make one of bit patterns (1) to (8) in FIG. 7, whereby the smoothing correction is applied on the determined edges.

In other words, in a case where the original image matches the matching pattern (1) in FIG. 3, then it is corrected to the pattern (1) in FIG. 7, in a case where the original image matches the matching pattern (2) in FIG. 3, then it is corrected to the pattern (2) in FIG. 7, and so on. As seen in FIG. 7, types of the smoothing correction in the second embodiment can be divided into four types of dot addition for adding dots at positions in 720 DPI resolution as shown in (1), (3), (5), and (7), and four types of dot displacement for moving dots to positions in 720 DPI resolution as shown in (2), (4), (6), and (8).

FIG. 8 illustrates bit patterns before and after smoothing correction according to the second embodiment. Image (1) in FIG. 8 is an original image, whereas image (2) is after the smoothing correction according to the second embodiment. As seen in FIG. 8, lines are not thickened, and edges which makes notches in the original image (1) are smooth compared to the first embodiment.

It should be noted that in order to attain 720 DPI resolution, a doubled number of dots at most have to be printed. Printing in 720 DPI resolution can be achieved by halving the printing head scanning speed in the second embodiment. However, the operation is not limited to this, and the same object can be achieved by doubling the driving frequency of the recording head, or by the combination of both types of change to the driving operation.

An example to improve the resolution in the horizontal direction is described in the second embodiment; however, it is also possible to perform the smoothing correction by improving the resolution in both the horizontal and vertical directions.

[Third Embodiment]

In the first and second embodiments, one of the correction patterns corresponds to one of the matching patterns. However, the best correction pattern for an original image matching a matching pattern is not always a single pattern, but may depend upon the print or non-print status of the neighboring pixels. There exists a method in which many matching patterns of larger size which include neighboring pixels are set and matching between an original image and the matching patterns is repeated many times, in order to perform a smoothing correction using the best correction pattern. However, the method becomes quite complicated, as a result executing the correction requires longer time.

Therefore, matching patterns used for determining positions to be smoothed in the third embodiment are the same eight types used in the first and second embodiments in order to simplify the smoothing correction method. Further, the number of consecutive black dots forming an edge corresponding to one of the determined shapes to be smoothed, in an original image, in the horizontal direction is determined and denoted as "x", and the number of successive dots in the vertical direction is determined and denoted as "y". Finally, the smoothing correction will be completed by operating a smoothing function with the "x" and "y" as its independent variables.

Figure 2:
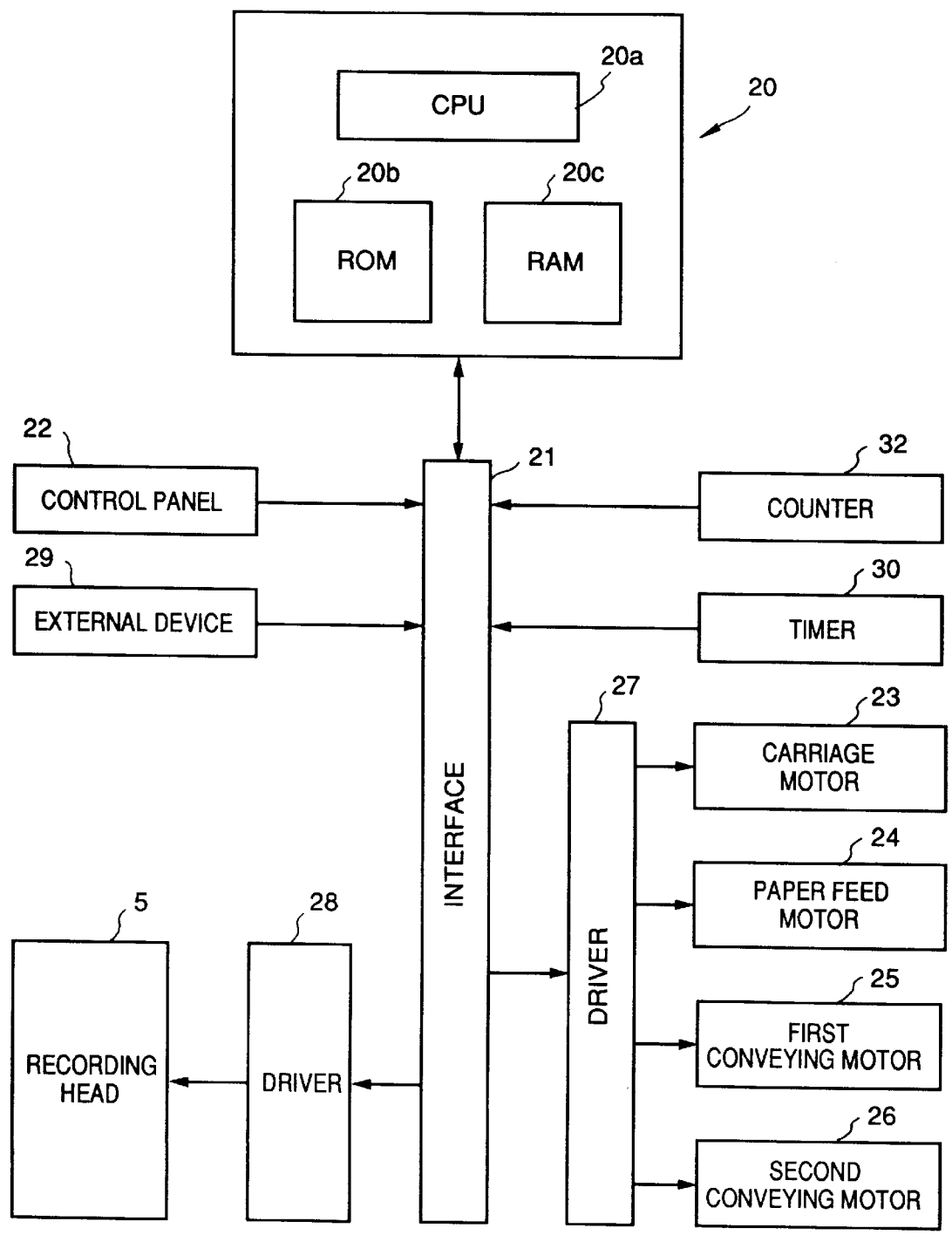
FIG. 2 is a block diagram showing a configuration of controllers according to that embodiment.

The construction of the printing apparatus in the third embodiment is the same as the one described in the first embodiment with reference to FIGS. 1 and 2, and therefore the description of the apparatus is omitted.

Figure 9:
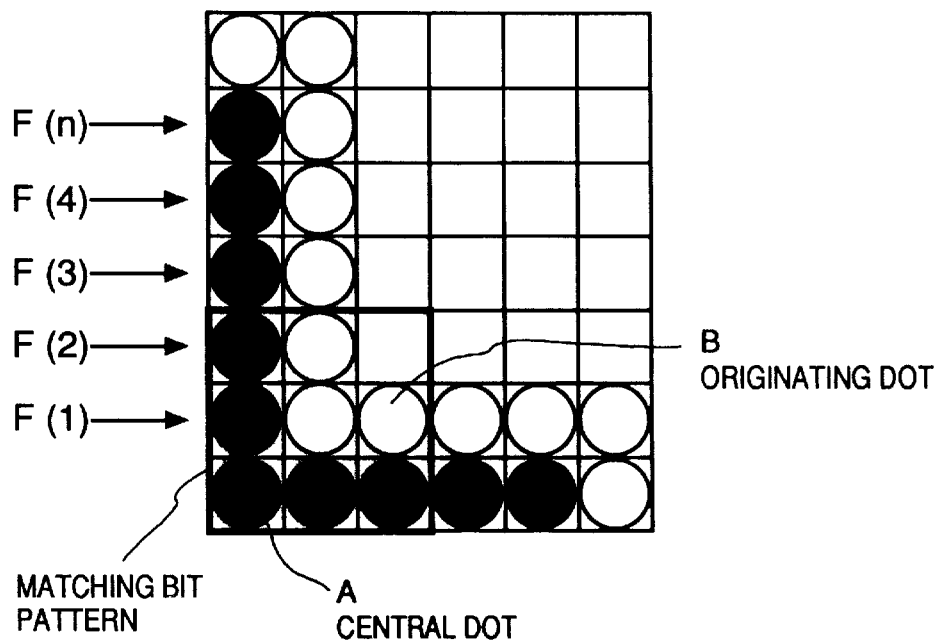
FIG. 9 is a view for explaining determination of numbers of successive dots, represented by x and y, according to a third embodiment of the present invention.

FIG. 9 is a view for explaining determination of numbers of successive dots, represented by x and y, according to the third embodiment of the present invention.

In FIG. 9, an area of an original surrounded by bold lines is matched to one of the eight matching patterns in FIG. 3 in the first embodiment. Reference numeral A denotes a central dot which is located at the center of a determined edge, and reference numeral B denotes an originating dot which is an origin for smoothing correction. The arrangement of dots in FIG. 9 is a dot pattern extracted from an original image including neighboring pixels of the area which is matched to the matching pattern.

In this embodiment, the number of consecutive black dots in the horizontal direction, "x", is determined by using exclusive or logic (X-OR). For example, starting from the central dot A in FIG. 9, values of dots which are arranged next to each other are inputted to an X-OR logic circuit, and an output is obtained. Since the central dot A has a value of "1" (for a print dot), a value returned from the X-OR logic circuit must be "0" regardless of a value of next dot. If the output is "0", then a count is incremented by one, and the same process is repeated by shifting in the horizontal direction until the logic circuit returns the value, "1". In order to obtain the number of consecutive black dots in the vertical direction "y", the same operation is repeated but shifting in the vertical direction instead of the horizontal direction. Thereby the numbers of consecutive black dots in the horizontal and vertical direction are determined.

After the determination of the numbers of consecutive black dots in the horizontal and vertical direction, the smoothing process is performed using the following smoothing function by substituting the variables "x" and "y":

$$F(n)=\text{int}(x-(x\times n)/y),$$

where x and y are the numbers of consecutive black dots in the horizontal and vertical directions, respectively, and n is the number of the line at which dots will be added, counting from the line "1" having the originating dot indicated by B in FIG. 9. Thus in FIG. 9, F(n) indicates the number of dots to be added in the line n, and int(x−(x×n)/y) means to round down the value of the argument at the decimal point to obtain the largest integer not greater than the argument.

In FIG. 9, the line indicated by F(1) corresponds to n=1, the line indicated by F(2) corresponds to n=2, and so on.

Further, in FIG. 7, since x=4 and y=5, $$F(1)=\text{int}(4-(4\times1)/5)=\text{int}(3.2)=3$$

$$F(2)=\text{int}(4-(4\times2)/5)=\text{int}(2.4)=2$$

$$F(3)=\text{int}(4-(4\times3)/5)=\text{int}(1.6)=1$$

$$F(4)=\text{int}(4-(4\times4)/5)=\text{int}(0.8)=0$$

Therefore, three dots are added in the line including the original dot (n=1), two dots are added in a n=2 line which is one line above from the n=1 line, and one dot is added in a n=3 line; however, in the lines whose "n" is more than 3, no dot is added, since F(n) returns a value "0" for n≧4 lines.

Figure 10:
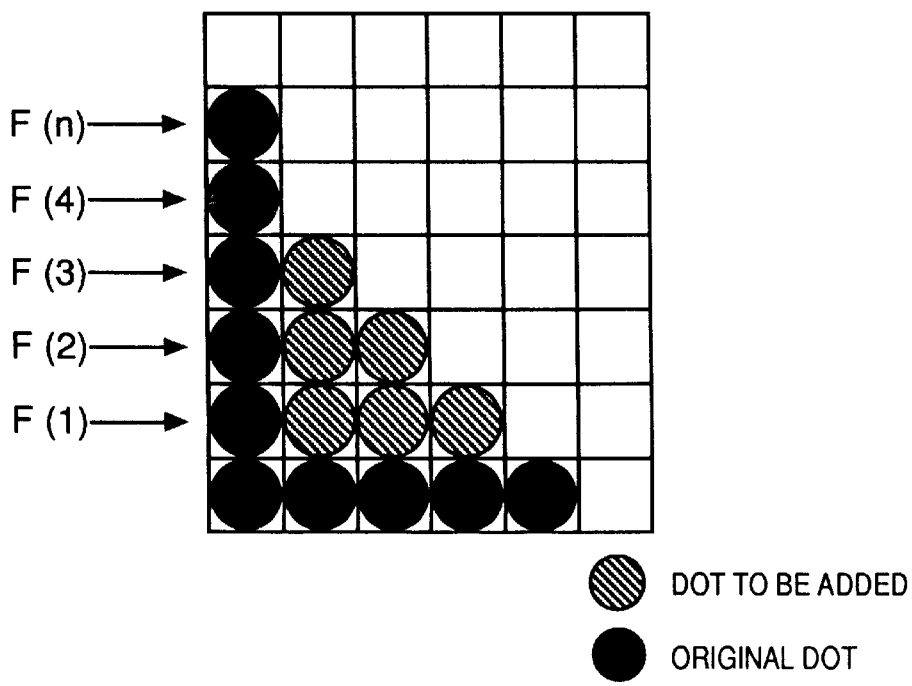
FIG. 10 illustrates a result of smoothing correction applied to an image shown in FIG. 9 according to the third embodiment of the present invention.

The result of the addition of the smoothing process applied to the image shown in FIG. 9 is shown in FIG. 10. Six dots are added in the image in FIG. 10 as compared to the original image in FIG. 9.

The object of the third embodiment is to add dots so as to smooth an edge containing as small as 1 mm difference, by using a printing apparatus of 360 DPI resolution. Therefore, the number of consecutive black dots is determined, up to a maximum of fourteen dots, and the number of lines to be supplied with added dots is n=7. However, the maximum number of consecutive black dots to be determined and the number of lines where dots need to be added, are not limited to the above, but will differ depending on type of printing apparatus.

Further, the exclusive or (X-OR) logic is used above to determine the number of consecutive black dots, but, the method to determine the number of consecutive black dots is not limited to this, and can be any method that will produce the needed information. For instance, the number can be determined by considering the status of pixels in the lines above and below the pixel of interest or of neighboring columns. Another determining method will be explained in examples described later.

Further, in this embodiment, a correction function which is a part of the smoothing correction method is $$F(n)=\text{int}(x-(x\times n)/y)$$

However, an object of the third embodiment is to obtain the number of dots to be added calculated based on the numbers of consecutive black dots in the horizontal and vertical directions, and thus the function to be substituted is not limited to the above function.

According to the third embodiment as explained above, it is possible to provide a printing apparatus capable of performing high quality smoothing correction on an original image efficiently by constructing the apparatus with an edge determining unit for determining areas to be smoothed by matching the matching patterns, a dot count unit for counting a number of consecutive black dots of the edge to be smoothed determined by the edge determining unit in the horizontal and vertical directions, and an operation unit for obtaining a number of dots to be added to the original image by operating a function using the counted numbers of consecutive black dots as its parameters.

[Fourth Embodiment]

In the third embodiment, there is described a smoothing method according to which edges (including right angles) are determined first by matching an original image to the eight matching patterns shown in FIG. 3, the numbers of consecutive black dots from the edge in the horizontal and vertical directions are determined, and dots are added to the original image depending on the determined numbers of consecutive black dots.

In the fourth embodiment, four matching patterns of (2×2) matrix are used to determine the edges of an original image. A process of a smoothing correction method in the fourth embodiment is simplified compared to the smoothing correction in the third embodiment.

In the fourth embodiment, an edge containing as small as 1 mm difference in an original image is determined in 360 DPI resolution. Differing from the conventional method, the method in the fourth embodiment does not use 784 matching patterns of a (14×14) matrix for comparing to the patterns in an original image. Instead, edges where the smoothing correction may be applied are determined first by using four matching patterns of a (2×2) matrix, and then only the determined edges are considered as the subject of the smoothing correction by another smoothing unit, which will be described below. Thus, the smoothing correction is performed very fast.

Figure 11:
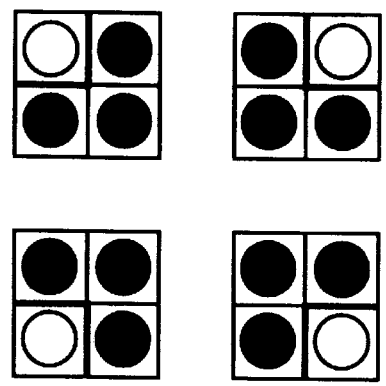
FIG. 11 shows four matching patterns for first determination according to a fourth embodiment of the present invention.

FIG. 11 shows examples of the four matching patterns for the first determination according to the fourth embodiment. In the fourth embodiment, first edges to be smoothed are determined by comparing the four matching patterns shown in FIG. 11 to all the pixels in the recording area of a record medium.

For an ordinary document, the ratio between the number of dots printed and the number of print dots possible in the recording area of a record medium is about 4% to 5%, and for a halftone image, such as a photograph, the ratio is about 20%. In addition, pixels which are the subject of the smoothing correction form outlines of the original image, and more specifically, form slopes which match one of predetermined patterns. Therefore, the areas which are the subject of smoothing correction are very limited.

Generally, as the matching possibility becomes lower, it is more efficient to find common characteristic patterns of the plurality of matching patterns to determine edges including the common characteristic pattern from the original image by comparing the original image with the common characteristic pattern, and then to compare the first determined areas with the plurality of patterns.

In a process described in the fourth embodiment based on the aforesaid method, instead of comparing all areas of the original image to the hundreds of matching patterns by shifting one pixel at a time in both the horizontal and vertical directions, common characteristic patterns of the matching patterns are found, and then the areas of the original image are compared first to the common characteristic patterns. This first determination makes the determining process very efficient.

By adopting the aforesaid method, after the areas for the smoothing correction are determined, the smoothing correction is applied to the determined areas in the fourth embodiment, in the same manner as the smoothing correction is applied in the third embodiment.

Figure 12:
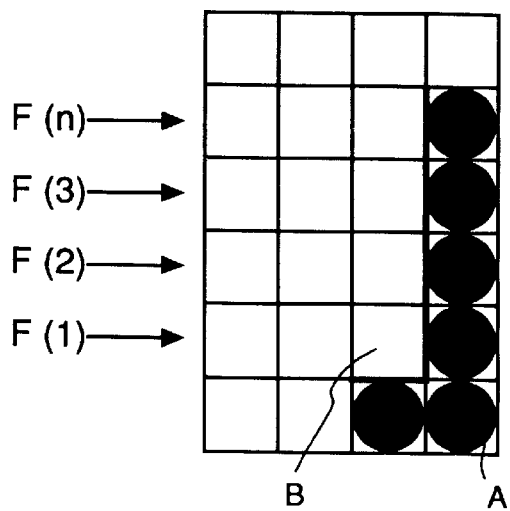
FIG. 12 shows a determined edge in an original image by a first determination unit according to the fourth embodiment of the present invention.

FIG. 12 illustrates an edge determined at the aforesaid first determination. At the first determination, only the existence of the edge, not the shape of the edge, is determined. Successively the numbers of consecutive black dots in the horizontal direction, "x", and in the vertical direction, "y", are counted in the fourth embodiment, and then the smoothing correction is performed by operating a smoothing function with the determined values "x" and "y" as its independent variables.

In the fourth embodiment, the numbers of consecutive black dots are determined as follows. The number of consecutive black dots in the horizontal direction, "x", is determined by using exclusive or (X-OR) logic. For example, starting from the central dot A in FIG. 12, the values of dots which are arranged next to each other are inputted to a X-OR logic circuit, and an output is obtained. Since the central dot has the value "1", "0" has to be returned from the X-OR logic circuit regardless of the value of the next dot. If the output is "0", then the count is incremented by one, and the same process is repeated by shifting in the horizontal direction until the output turns to "1". In order to obtain the number of consecutive black dots in the vertical direction, "y", the same process as described above is repeated by shifting in the vertical direction. Thereby, the numbers of consecutive black dots in the horizontal and vertical directions are determined.

After the determination of the numbers of consecutive black dots in the horizontal and vertical directions, the smoothing correction is operated by using a following function by substituting the variables x and y $$F(n)=\text{int}(x-(x\times n)/y),$$

where x and y are the numbers of consecutive black dots in the horizontal and vertical directions, respectively, and n is the number of the line at which dots are added, when the line including the originating dot indicated by B in FIG. 12 is counted as line 1. Further, F(n) indicates the number of dots to be added in the line n, and int(x−(x×n)/y) means to round down at the decimal point to obtain the next smaller integer value.

Further, in FIG. 12, the line indicated by F(1) corresponds to an n=1 line, the line indicated by F(2) corresponds to an n=2 line, the line indicated by F(3) corresponds to an n=3 line, and so on.

Further, in FIG. 12, since x=2 and y=4, thus, $$F(1)=\text{int}(2-(2\times 1)/4)=\text{int}(1.5)=1$$

$$F(2)=\text{int}(2-(2\times 2)/4)=\text{int}(1.0)=1$$

$$F(3)=\text{int}(2-(2\times 3)/4)=\text{int}(0.5)=0$$

Therefore, one dot is added in the line including the originating dot (n=1), and one dot is added in the n=2 line which is one line above from the n=1 line. However, in the lines whose "n" is more than 2, no dot is added, since F(n) returns a value of "0" for n≧3 lines.

Figure 13:
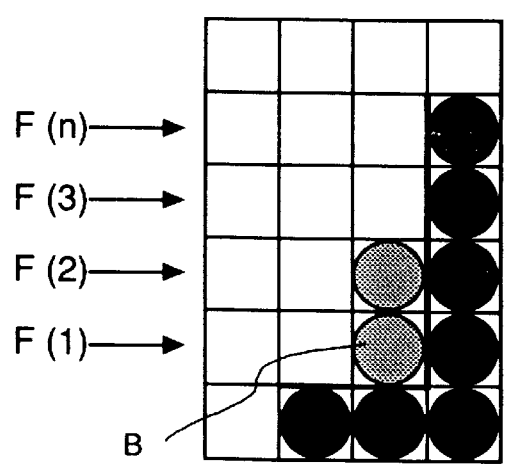
FIG. 13 shows a result of smoothing correction applied to the edge illustrated in FIG. 12 according to the fourth embodiment of the present invention.

The result of the aforesaid smoothing corrections is shown in FIG. 13. The image in FIG. 13 has two dots added, as compared to the image in FIG. 12.

Figure 14:
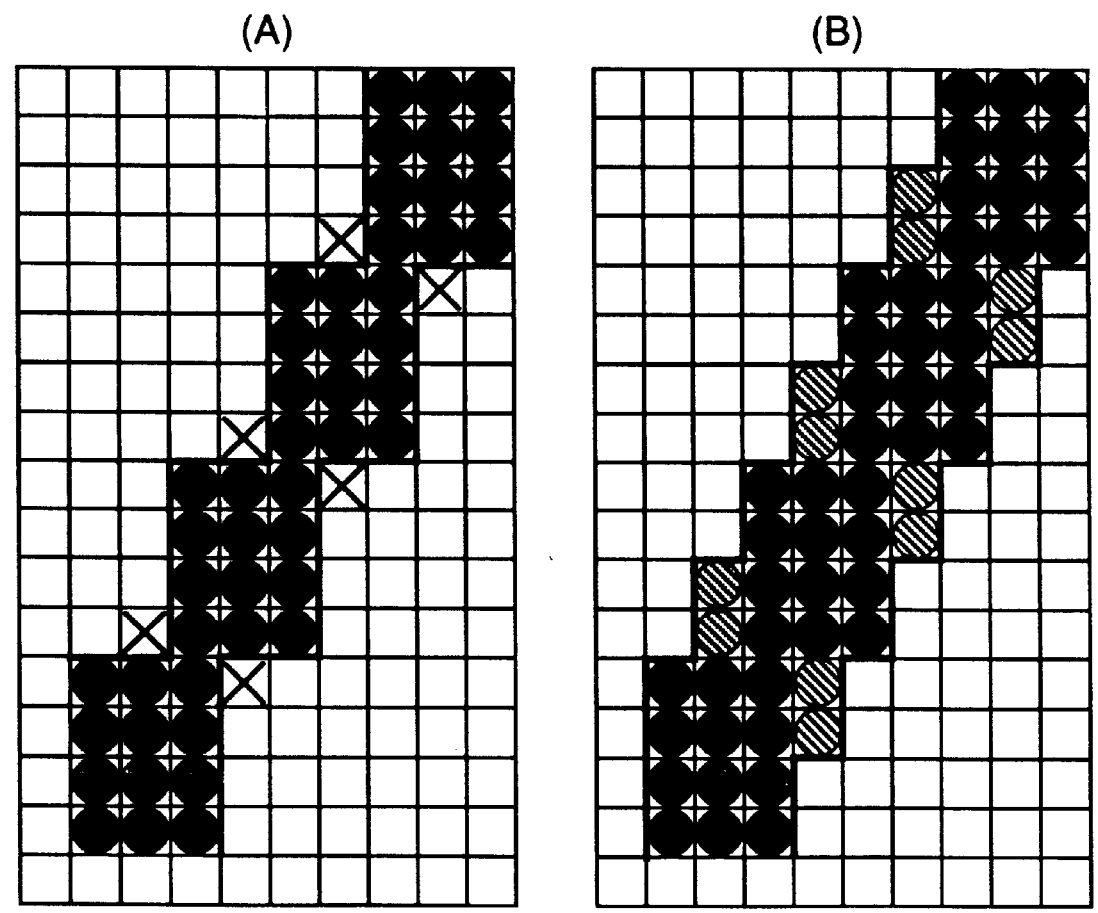
FIG. 14 shows bit map images before and after smoothing correction according to the fourth embodiment.

FIG. 14 illustrates images before and after the smoothing correction of the fourth embodiment. (A) in FIG. 14 is an original image before the smoothing correction, and (B) in FIG. 14 is the image after the smoothing correction. Pixels filled with X in (A) in FIG. 14 are the originating pixels for the smoothing correction and they are determined at the first determination as described above, and pixels represented by circles filled with slashes in (B) in FIG. 14 are the added pixels after the operation of the aforesaid function. As seen in FIG. 14, as the result of the operation based on the original image (A), the total of 12 pixels are added in the image (B).

The object of the fourth embodiment is to add dots so as to smooth an edge containing as small as a 1 mm difference, by using a printing apparatus of 360 DPI resolution. Therefore, the consecutive black dots are determined up to a maximum of fourteen dots, and the number of lines to which dots are to be added is n=7. However, the maximum number of the consecutive black dots to be determined and the number of line to be added with dots are not limited to the example as above, but they will differ depending on the type of printing apparatus.

Further, the exclusive or (X-OR) logic is used to determine the number of consecutive black dots above; however, the method to determine the number of consecutive black dots is not limited to this, and can instead be any other known method as far as the number can be determined.

Further, in this embodiment, the smoothing function which is a part of the smoothing correction method is:

$$F(n)=\text{int}(x-(x\times n)/y)$$

However, an object of the fourth embodiment is to obtain the number of dots to be added by using the numbers of consecutive black dots in the horizontal and vertical directions as variables, and thus the function for calculating the numbers of consecutive black dots is not limited to the above.

According to the fourth embodiment as explained above, it is possible to provide a printing apparatus capable of performing high quality smoothing correction on an original image efficiently, by constructing the apparatus with a first edge determining unit for determining edges to be smoothed, a dot number determining unit for determining numbers of consecutive black dots in the horizontal and vertical directions in the edges to be smoothed determined by the edge determining unit, and an operation unit for obtaining a number of dots to be added to the original image by operating a function using the numbers of consecutive black dots as its parameters.

[Fifth Embodiment]

Next, a smoothing correction superior to the one in the fourth embodiment will be described in a fifth embodiment. In the fifth embodiment, the basic structure of the printing apparatus is the same as the one described in the first embodiment with reference to FIGS. 1 and 2.

In the fourth embodiment, the placement of dots to the original image is based on the resolution of the original image, namely 360 DPI, whereas in the fifth embodiment, the placement of dots is performed in the doubled resolution, namely 720 DPI, as compared to the resolution in the fourth embodiment, in the horizontal direction.

In the fifth embodiment, the method to determine edges for the smoothing correction is the same as the method described in the fourth embodiment. The function to obtain the number of pixels to be added is set as follows:

$$F(n)=\text{int}(2x-(2x\times n)/y)$$

As before, the number of the dots to be added in the line n is obtained from the function, F(n); however, in the fifth embodiment, the additional dots are placed at positions in 720 DPI resolution.

Figure 15:
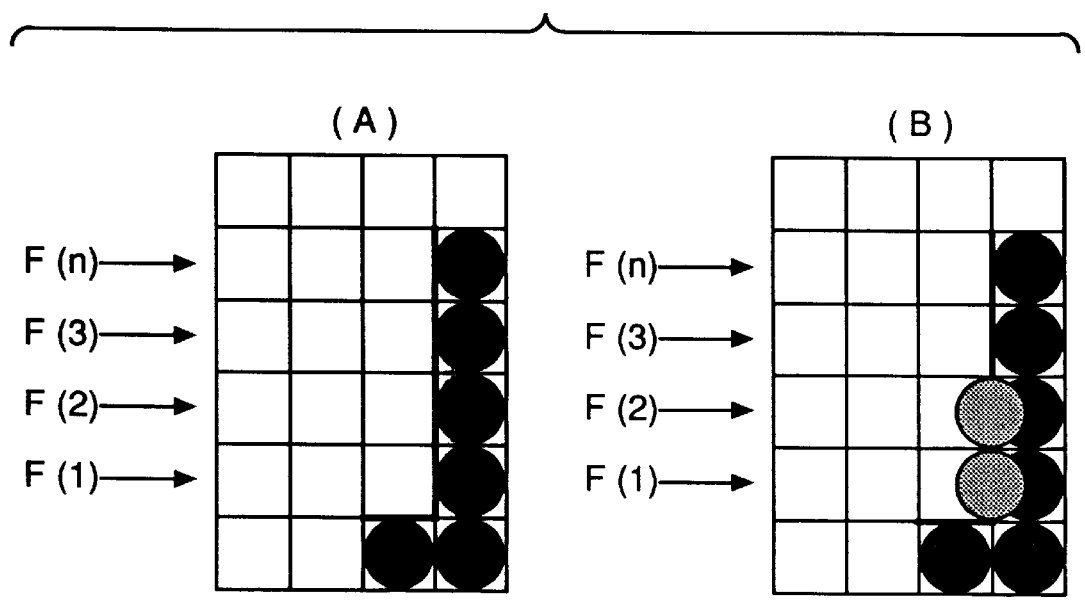
FIG. 15 shows bit patterns explaining an adding process according to a fifth embodiment of the present invention.

FIG. 15 illustrates images before and after the smoothing correction in the fifth embodiment. (A) is an original image, and (B) is an image after dots are added to the original image (A).

Further, in FIG. 15, since x=1 and y=4, thus, $$F(1)=\text{int}(2\times 1-(2\times 1\times 1)/4)=\text{int}(1.5)=1$$

$$F(2)=\text{int}(2\times 1-(2\times 1\times 2)/4)=\text{int}(1.0)=1$$

$$F(3)=\text{int}(2\times 1-(2\times 1\times 3)/4)=\text{int}(0.5)=0$$

Therefore, one dot is added in the line including the original dot (n=1), and one dot is added in the line which is one line above the n=1 line (i.e., n=2 line); however, in the lines whose "n" is more than 2, no dot is added since F(n) returns a value, "0", for n≧3 lines.

The result of the aforesaid smoothing correction is shown in (B) in FIG. 15. As compared to (A) in FIG. 15, two dots are added at positions in 720 DPI resolution.

Figure 16:
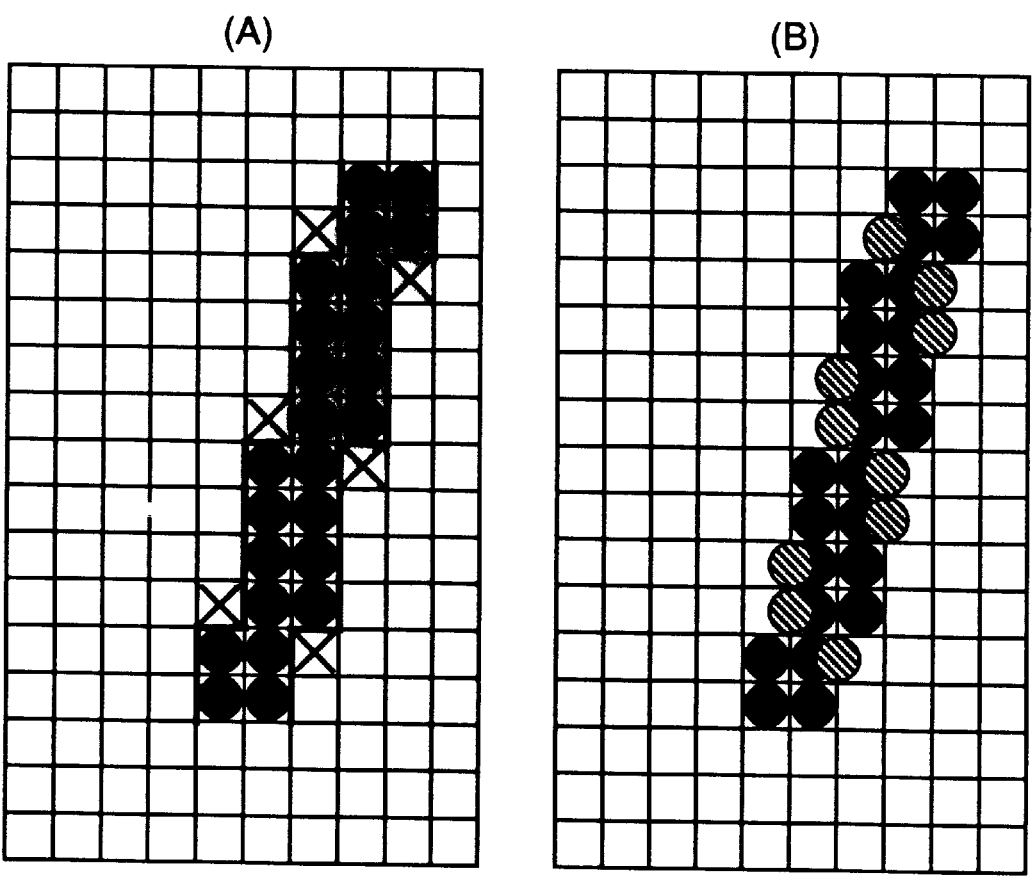
FIG. 16 illustrates bit map images before and after smoothing correction according to the fifth embodiment.

FIG. 16 illustrates images before and after the smoothing correction. (A) in FIG. 16 shows an original image before the smoothing correction, and (B) in FIG. 16 shows an image after the smoothing correction. Pixels marked with X's in (A) in FIG. 16 are the originating dots of edges to be smoothed determined by the first edge determining unit. The result of the addition of dots by the originating pixels after operating the function is shown in (B) in FIG. 16. As seen in (B) in FIG. 16, ten dots are added in accordance with the smoothing correction at positions in the 720 DPI resolution.

According to the fifth embodiment, as seen in FIG. 16, it is possible to perform superior smoothing correction, preventing lines of an image from being thickened, by adding dots at the doubled resolution pixel positions (in 720 DPI resolution).

It should be noted that in order to attain 720 DPI resolution, double the number of dots, at most, need to be printed. Printing in 720 DPI resolution by using a 360 DPI printing apparatus can be achieved by halving the scanning speed. However, the operation is not limited to the above example, and the same object can be achieved by doubling the driving frequency of the recording head, or by a combination of both.

The object of the fifth embodiment is to add dots so as to smooth an edge containing, as small as a 1 mm difference, by using a printing apparatus of 360 DPI resolution. The consecutive black dots are counted up to a maximum of fourteen dots. However, the maximum number of the consecutive black dots to be determined and the number of line to be added with dots are not limited as above, and will differ depending on the type of printing apparatus.

According to the fifth embodiment, if F(n)=3, for instance, three dots should be added at the 720 DPI pixel positions of the n=3 line. However, since the size of each dot is the normal size for 360 DPI resolution, there can be added another control such that only the outermost dots are added at the 720 DPI pixel to positions, and dots inside are added at the 360 DPI pixel positions.

The printing apparatus has the same configuration and functions as the one described in the fourth embodiment except for having also a double-resolution dot adder which adds dots at the doubled resolution pixel positions, and therefore the detailed description of the printing apparatus is omitted.

[Sixth Embodiment]

In a sixth embodiment of the present invention, there is described smoothing correction which produces an image of high quality. In the sixth embodiment, the basic construction of the printing apparatus is the same as the one described in the first embodiment with reference to FIGS. 1 and 2, and thus the description of the construction of the same units are omitted.

In the fifth embodiment, only addition of dots to the original image is employed as the smoothing correction. Therefore, when the smoothing correction is applied to the original image, the original image may be thickened although the notches are reduced. In order to solve this problem, in the sixth embodiment, not only the addition of dots but also displacement of dots is considered in the smoothing correction.

Figure 17:
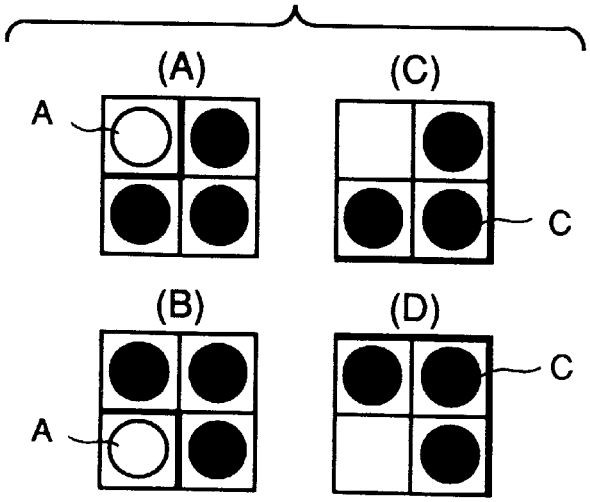
FIG. 17 shows four matching patterns according to a sixth embodiment.

FIG. 17 illustrates matching patterns used for first determination of edges to be smoothed in the sixth embodiment. In the sixth embodiment, the matching patterns shown in (A) to (D) in FIG. 17 are used to determine edges. More specifically, (A) and (B) in FIG. 17 are for detecting originating dots A, and the determination process by using the patterns (A) and (B) is similar to the process in the fifth embodiment, while (C) and (D) in FIG. 17 are for detecting the displacement originating dots C's which are the originating dots to be moved, and this determination process by using the patterns (C) and (D) is not in the smoothing correction method according to the fifth embodiment.

In a case where the dots are added on the basis of the matching patterns (A) and (B) for the first edge determination shown in FIG. 17, and where the central dots A are determined in the sixth embodiment, the determining process for determining the numbers of consecutive black dots in the horizontal and vertical directions is the same as described in the fifth embodiment.

In a case where the dots are moved on the basis of the match patterns (C) and (D) for the first edge determination shown in FIG. 17, and where the displacement originating pixels C's are determined, the numbers of consecutive black dots in the horizontal and vertical directions are counted, and numbers of dots, which are calculated by using a smoothing function with the determined numbers of consecutive black dots as the independent variables, are moved.

Note that lines where dots are added (represented by n in the aforementioned embodiments) extend in the vertical direction of consecutive black dots originated from the displacement originating pixels C. Further, the displacement of dots can be performed in the normal resolution (e.g., 360 DPI), or in the double resolution (e.g., 720 DPI), as in the case in the fifth embodiment. However, when displacement of dots is performed in the normal resolution, some dots may overlap other dots, and in this case, those overlying dots can be eliminated instead of being moved. Furthermore, the process can be a mixture of displacement and elimination of dots, and the process is realized by setting functional conditions.

Figure 18:
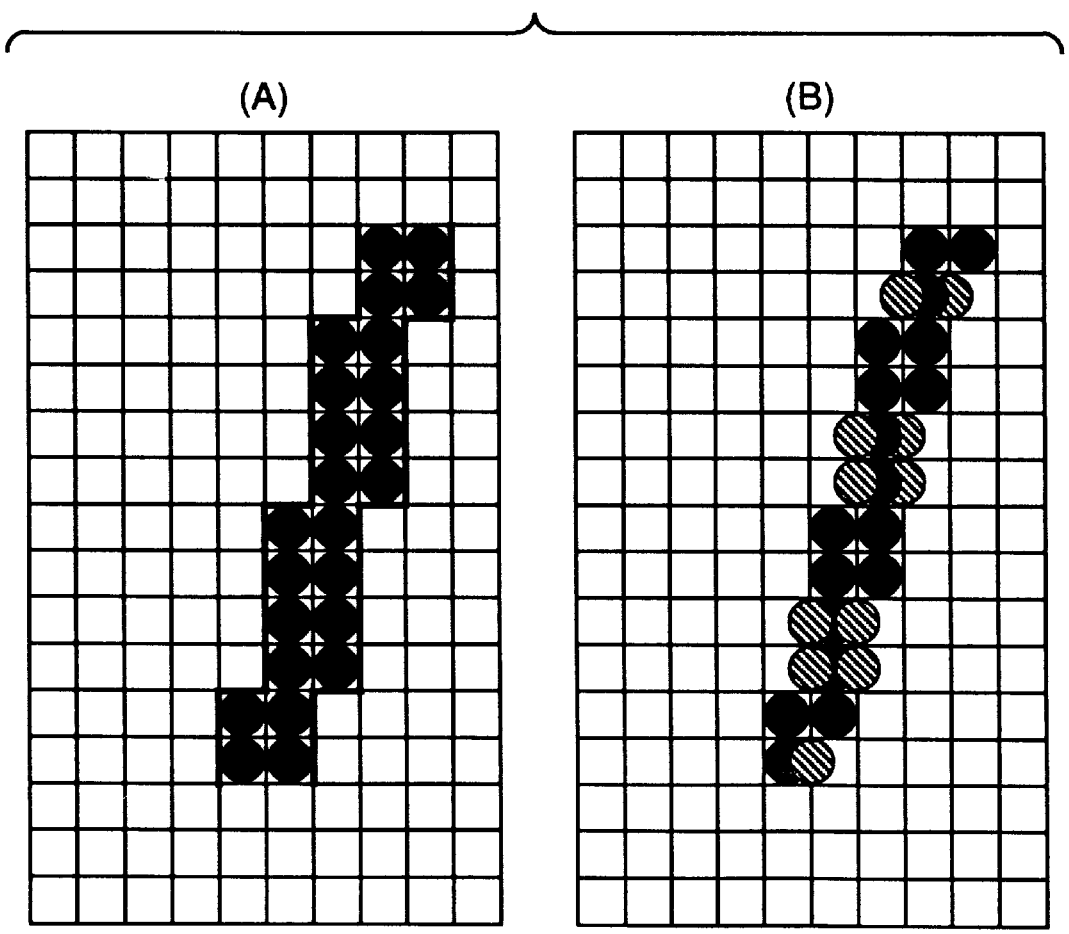
FIG. 18 illustrates bit map images before and after smoothing correction according to the sixth embodiment.

Images before and after the smoothing correction according to the sixth embodiment are illustrated in FIG. 18. (A) in FIG. 18 shows an original image before the smoothing correction, and (B) in FIG. 18 shows an image after the smoothing correction. As seen in FIG. 18, five pixels are added according to the matching patterns for the first determination shown in (A) in FIG. 17, and six pixels are moved according to the matching patterns for the first determination shown in (C) in FIG. 17.

According to the sixth embodiment as described above, as seen in FIG. 18, by controlling both addition and displacement of dots, the image of higher quality can be produced.

The object of the sixth embodiment is to add dots so as to smooth an edge containing as small as a 1 mm difference, by using a printing apparatus of 360 DPI resolution. Therefore, the number of consecutive black dots is determined, up to a maximum of fourteen dots. However, the maximum number of the consecutive black dots to be determined and the number of lines to be supplied with additional dots are not limited to the above example, and will differ depending on a type of printing apparatus.

[Seventh Embodiment]

In the third to sixth embodiments, the matching patterns are used for determining edges. In a seventh embodiment, edges are determined by means of functions based on input data, and a smoothing correction is performed in accordance with the number of consecutive black dots in the horizontal direction, "x", and in the vertical direction, "y", and with the status of the data. The smoothing correction according to above description will be explained below in detail.

Again, the basic construction of a printing apparatus in the seventh embodiment is basically the same as the one shown in FIGS. 1 and 2, and therefore the description of the apparatus is omitted.

Figure 19:
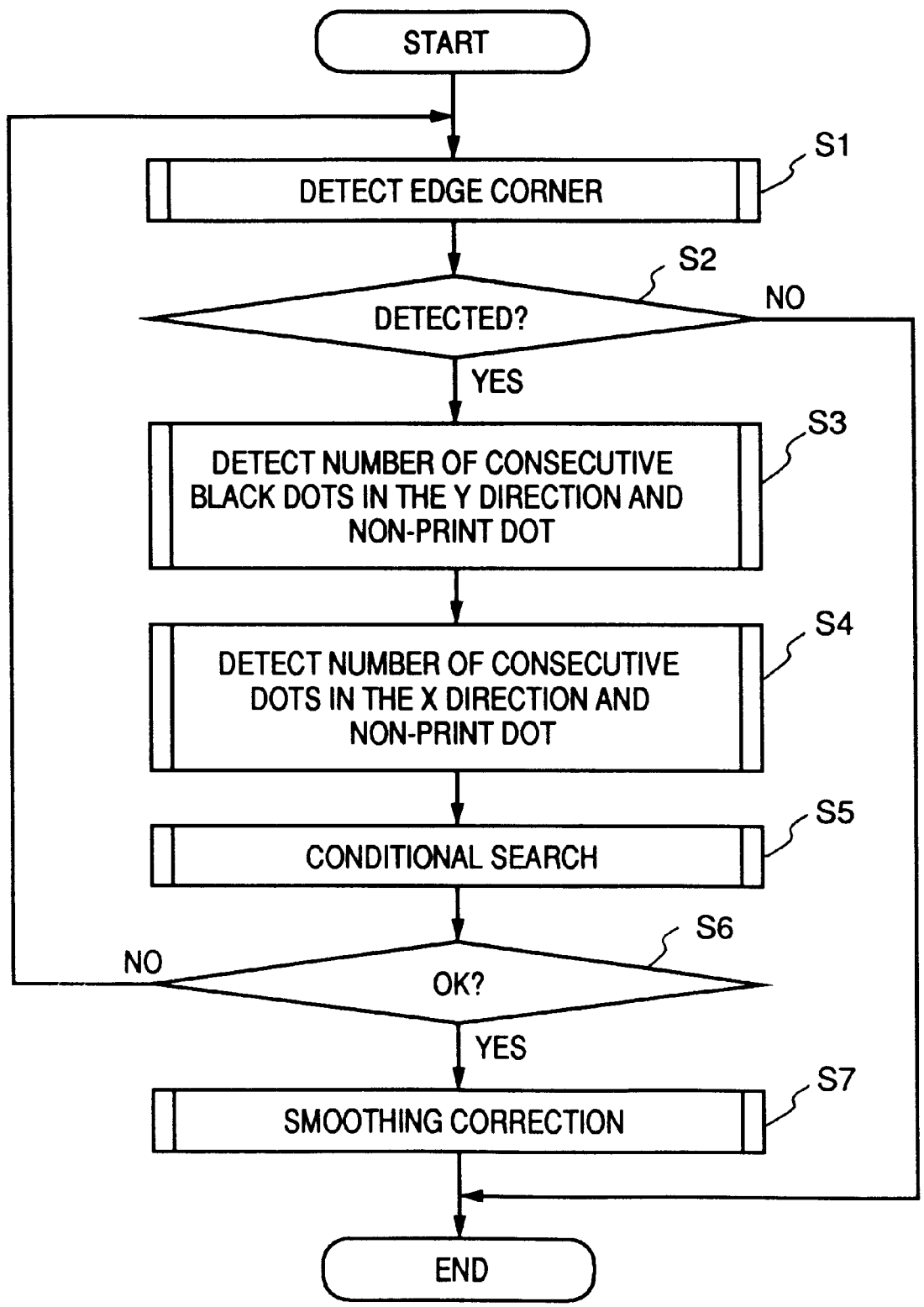
FIG. 19 is a flowchart explaining a smoothing process according to a seventh embodiment.

FIG. 19 is a flowchart explaining a smoothing process utilized in the seventh embodiment. A program which functions as the flowchart shown in FIG. 19 is stored in the ROM 20b in FIG. 2, and the program is executed by the CPU 20a.

At step S1 in FIG. 19, corners of an original image are determined. The detailed process of determination of the corners are described below.

Figure 20:
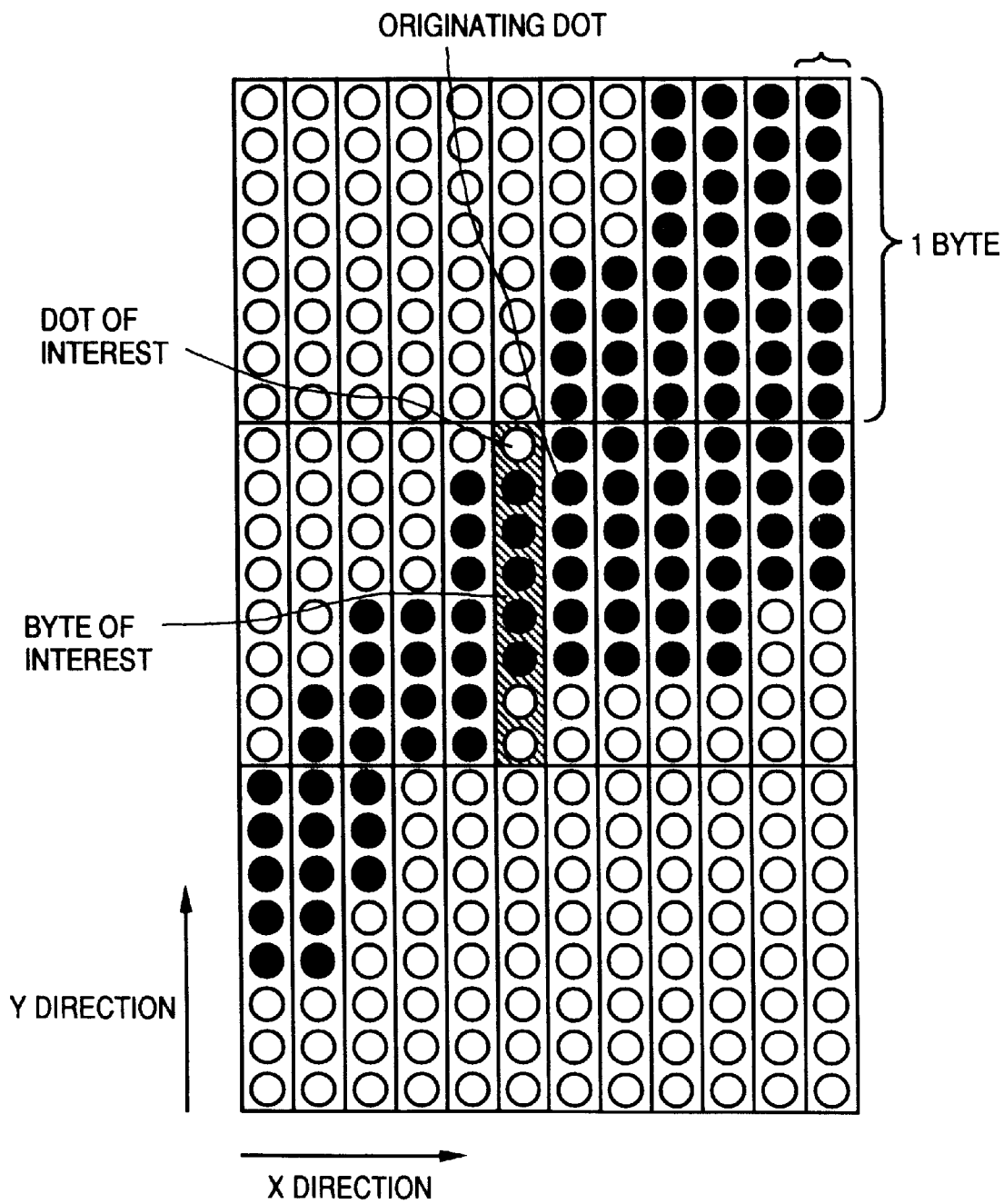
FIG. 20 is a bit map image for explaining a determination process according to the seventh embodiment.

FIG. 20 illustrates a state of one of the corners in the inputted original image. Following is an example of processing a byte of interest, which is highlighted with slashes, of the edge shown in FIG. 20.

In the seventh embodiment, a process proceeds by one byte data as a unit composed of eight pixels referred by numerals 0 to 7 in FIG. 20.

Figure 21:
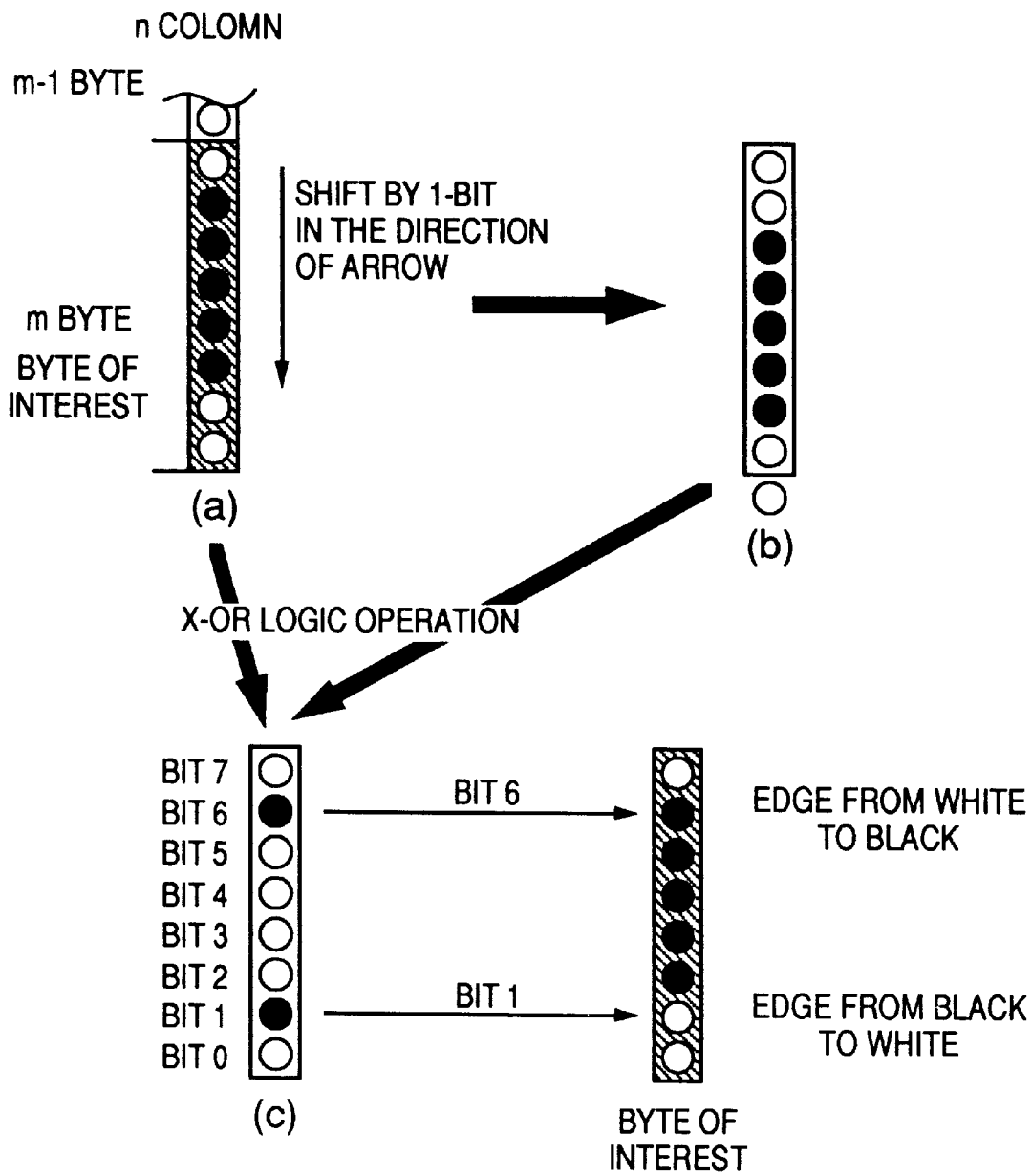

At step 1, corners are determined, and data (A) of byte of interest and data (B) which is obtained by shifting the data (A) of the byte of interest by one bit are operated according to the external or (X-OR) logic. When at least one of the data is black, then it is recognized that there is an edge. In the example in FIG. 21, an edge will be determined at bit 6 which changes from white to black and another edge will be determined at bit 1 which changes from black to white. Then 1 is added to bit 6 which changed from white to black, and bit 7 becomes the bit of interest. Next, as shown in FIG. 22, a bit 7 in a n−1 column, a bit 7 in a n column, and a bit 7 in a n+1 column are operated based on the X-OR logic, whereby the direction of the corner can be determined.

Figure 24:
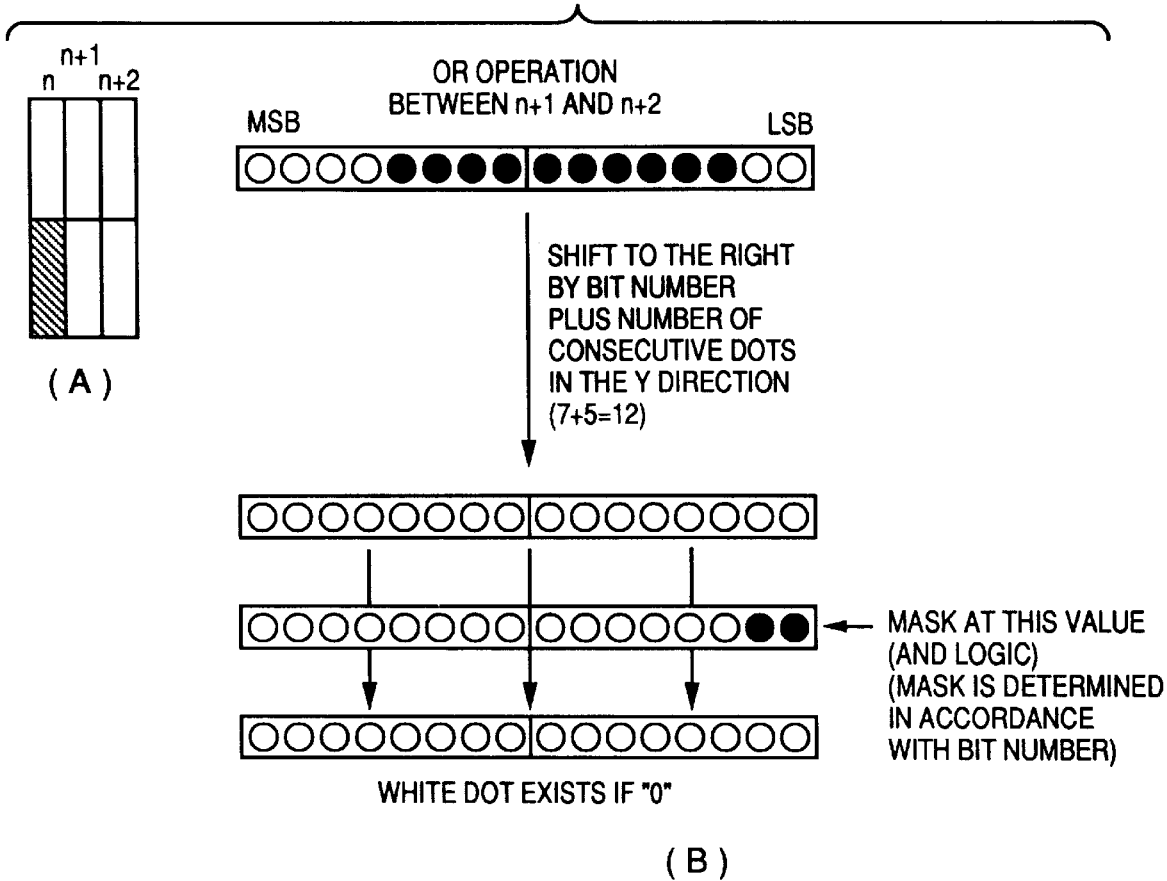

Next, a determining process of the number of consecutive black dots in the Y-direction at step S31 in FIG. 19 is explained. The process is performed by using data of eight bytes including the byte of interest, as shown in (A) in FIG. 23. The detailed process is illustrated in (B) in FIG. 23, and in this case, five white dots stretch from the LSB. This shows the number of consecutive black dots from the dot of interest in FIG. 20 in the Y-direction. Further, whether or not a non-print area (composed of four white dots in FIG. 23) beyond the consecutive black dots exists, is determined. The determining method is shown in FIG. 24. In this case, a white dot is determined to exist. At step S4, likewise, a number of consecutive black dots in the X-direction and whether or not a white dot exists are determined.

In an example shown in FIG. 24, it is determined that there are two consecutive black dots in the X-direction from LSB, and there exist white dots after these consecutive black dots.

Next, at step S5, a determination is made as to whether or not any correction is to be performed on data, on the basis of the numbers of consecutive black dots in the X- and Y-directions and on the determined result as to whether or not white dots exist beyond the consecutive black dots is checked.

Figure 25:
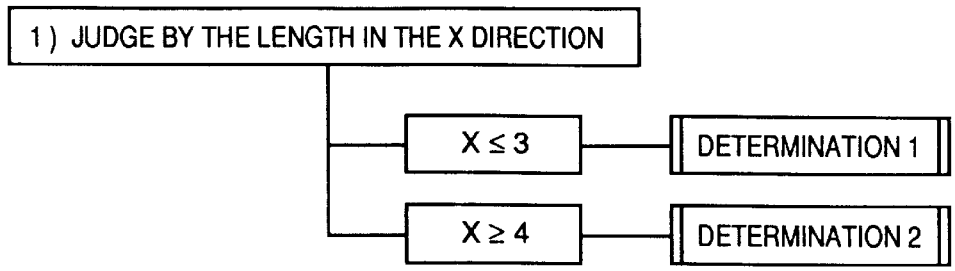
FIGS. 25 to 27 are flowcharts explaining a conditional search for smoothing correction according to the seventh embodiment.
Figure 26:
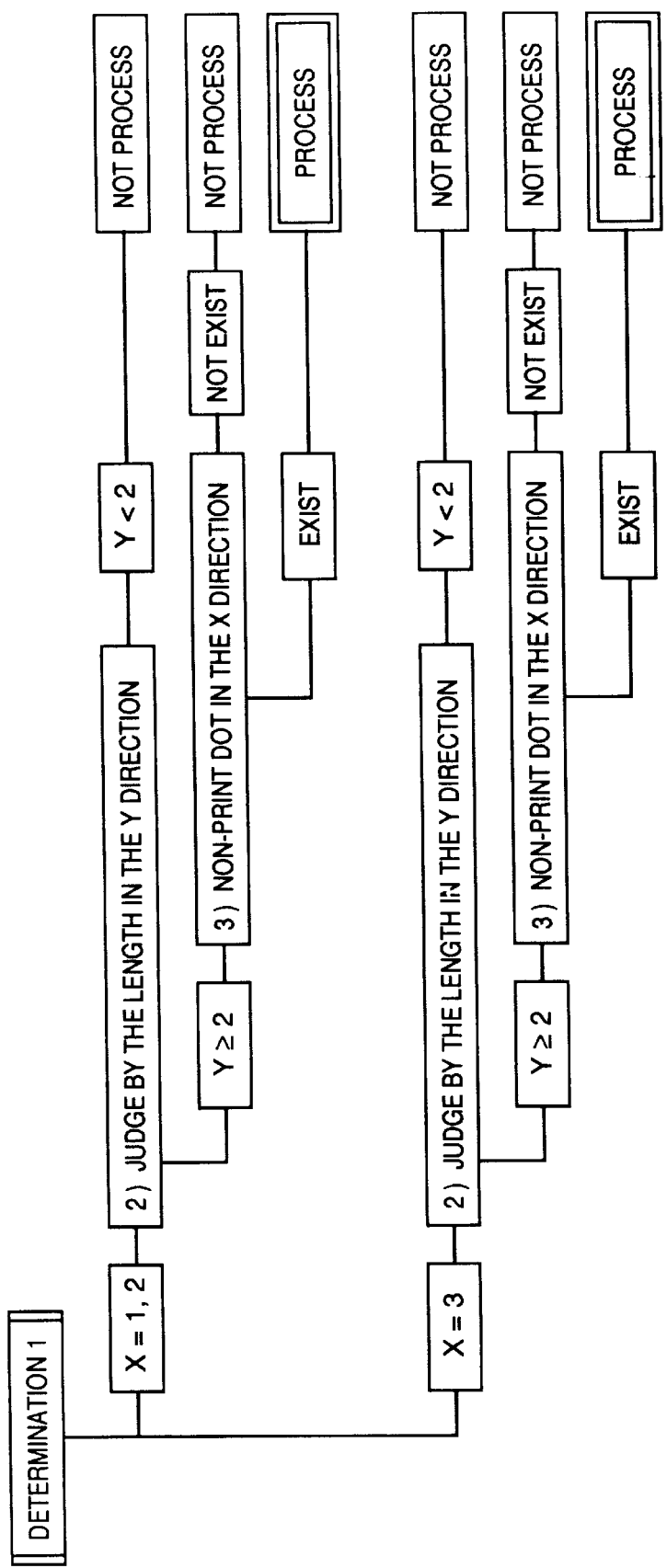
Figure 27:
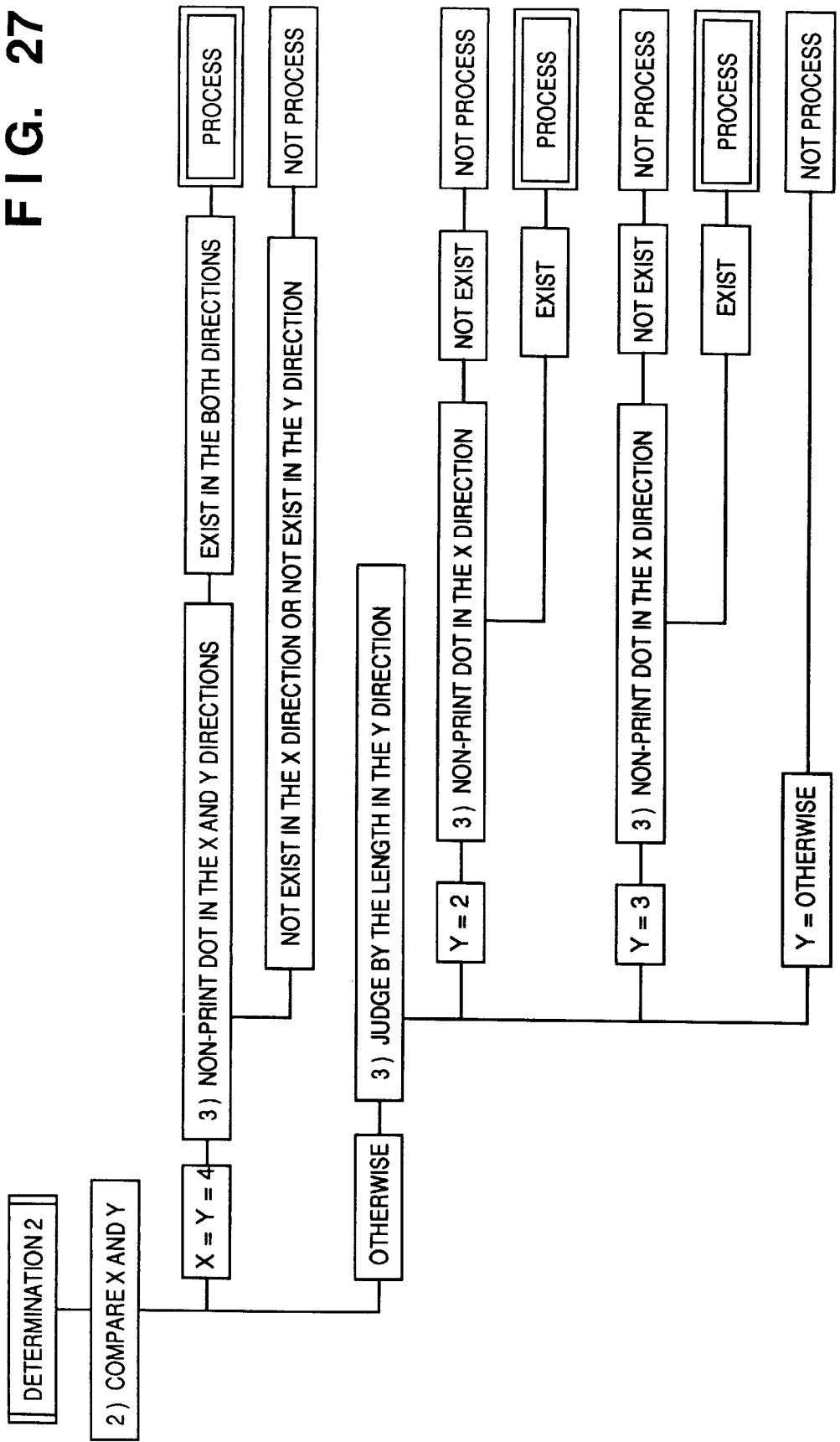
Figure 28:
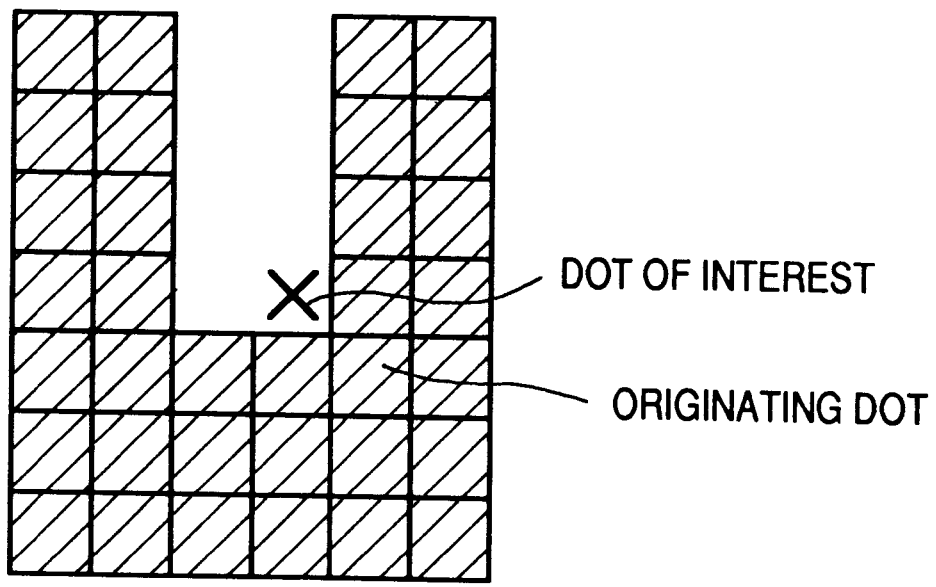
FIG. 28 is an image which is not for a smoothing correction.
Figure 30A:
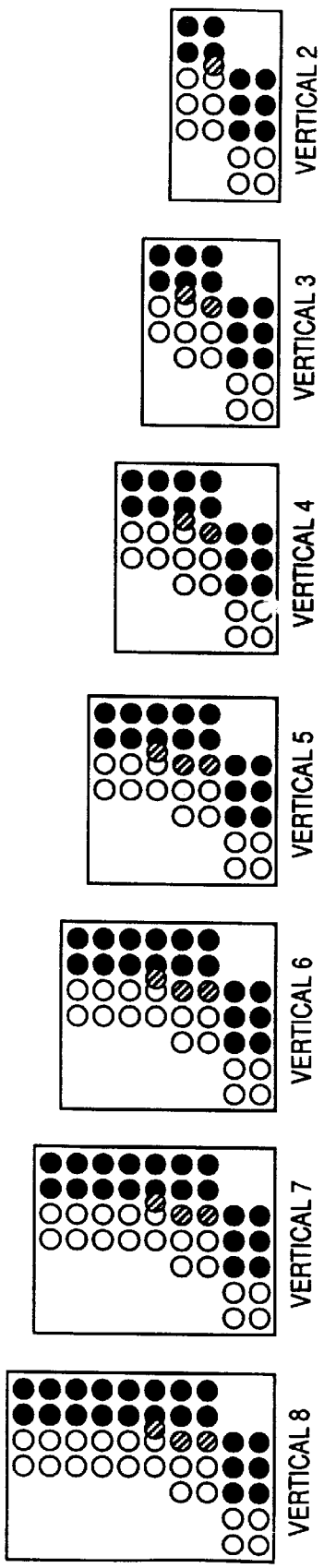
Figure 30B:
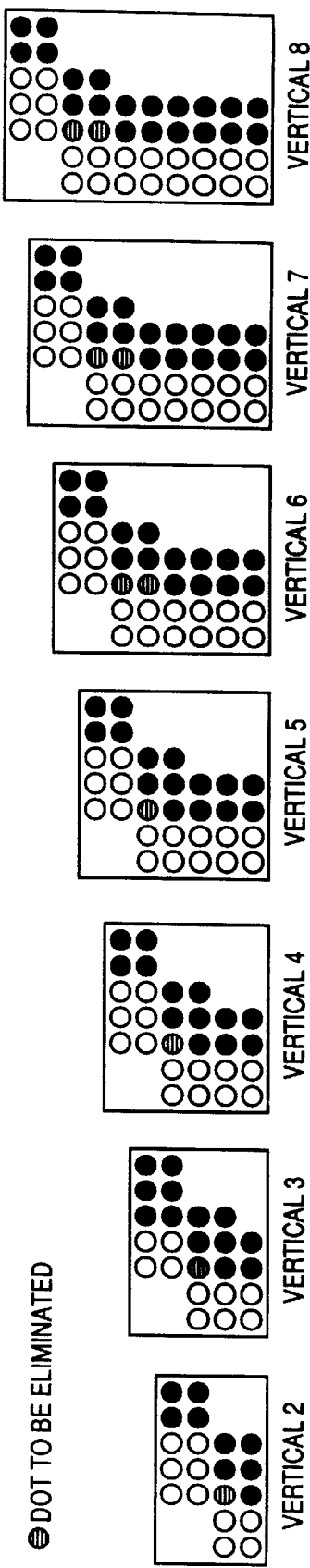

FIGS. 25 to 27 are tree diagrams explaining the detailed determination process. If "not process" is determined at step S5, the first determined area is determined to be one that is not to be subjected to the smoothing correction. In an example illustrated in FIG. 28, the number of consecutive black dots in the X-direction from the originating dot is two, and any non-print dot is determined in the X-direction. In that case, the result of the determination process ends at A in FIG. 26, and therefore, the smoothing correction is not applied to an area around the dot of interest.

Next, when the smoothing correction is determined to be performed on a determined edge at step S6 on the basis of the result of the conditional search at step S5, then the process proceeds to step S7, where the smoothing correction is performed on the edge. The smoothing correction on the edge is performed in accordance with the numbers of consecutive black dots in the X- and Y-directions.

The smoothing correction when x=2 is described in FIGS. 29A and 29B. Pixels represented by circles with slashes inside are to be added, and pixels represented by a circles with horizontal lines inside are to be eliminated. In both FIG. 29A and 29B, the value of x is two; however, the numbers and positions of dots to be added or moved in FIG. 29A differ from the numbers and positions in FIG. 29B. Similarly, the smoothing corrections when x=3, y=2, and y=3 are shown in FIGS. 30A, 30B, 31A, 31B, 32A and 32B, respectively.

Note that the smoothing correction is performed by writing bit patterns stored in a ROM table to a 720 DPI memory in advance in accordance with the values of x and y, the direction of the corner, and bit positions.

As an example, the correction when x=1 or 2 is explained with reference to FIG. 33.

Figure 33:
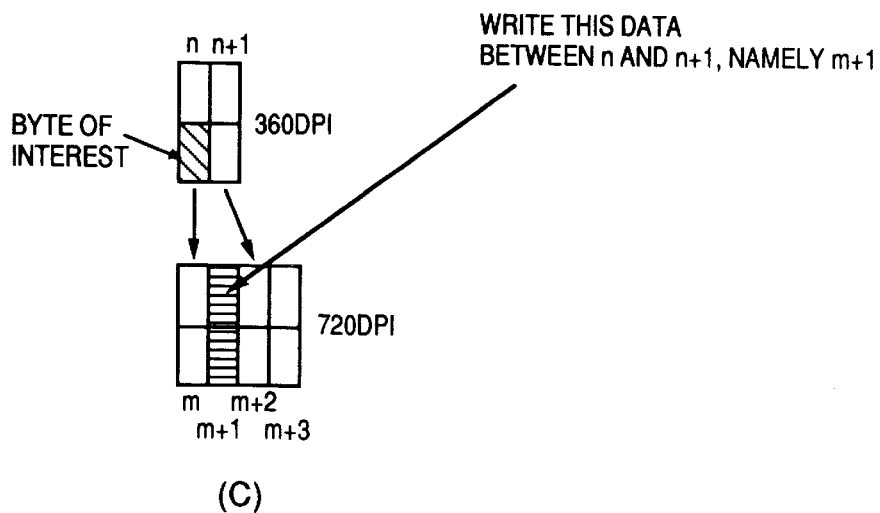
FIG. 33 is a diagram explaining a smoothing correction method according to the seventh embodiment.

FIG. 33 is a table stored in the ROM. If a number of consecutive black dots in the Y-direction is five and the bit of interest is 7, then data of y=5 is read from the table shown in (A) in FIG. 33, and shifted by five bits, then store the shifted data in a 720 DPI memory area, thus the smoothing correction is performed.

(B) in FIG. 33 shows a part of 360 DPI memory area where the original image is stored, and (C) in FIG. 33 shows a part of 720 DPI memory area. In the 720 DPI memory area, an original image data stored in a 360 DPI memory area and the data obtained after the smoothing correction are combined, then stored. Printing is performed on the basis of the 720 DPI data. Therefore, the operation of a printing apparatus is the same as in the above embodiments.

Figure 34:
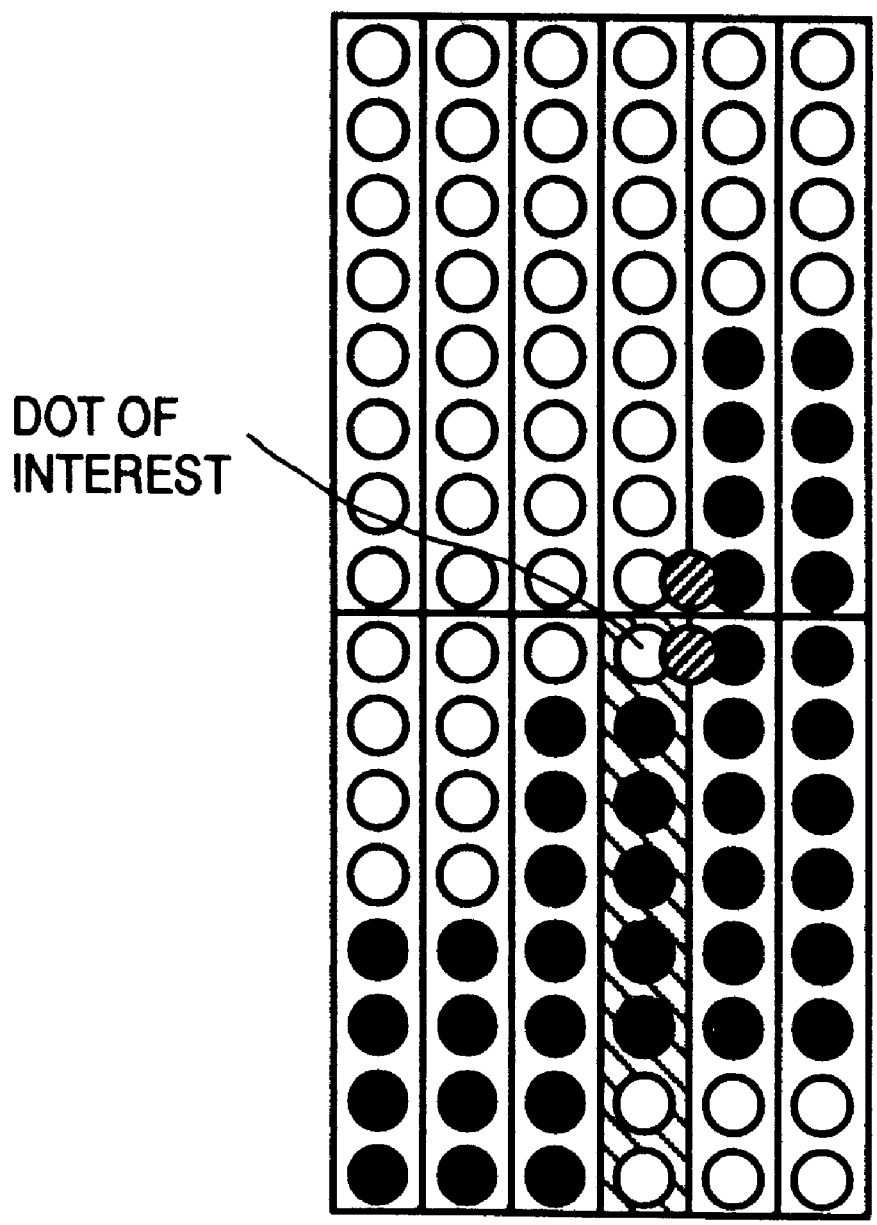
FIG. 34 is a bit map image showing a result of a smoothing correction applied to the image in FIG. 20.
Figure 35:
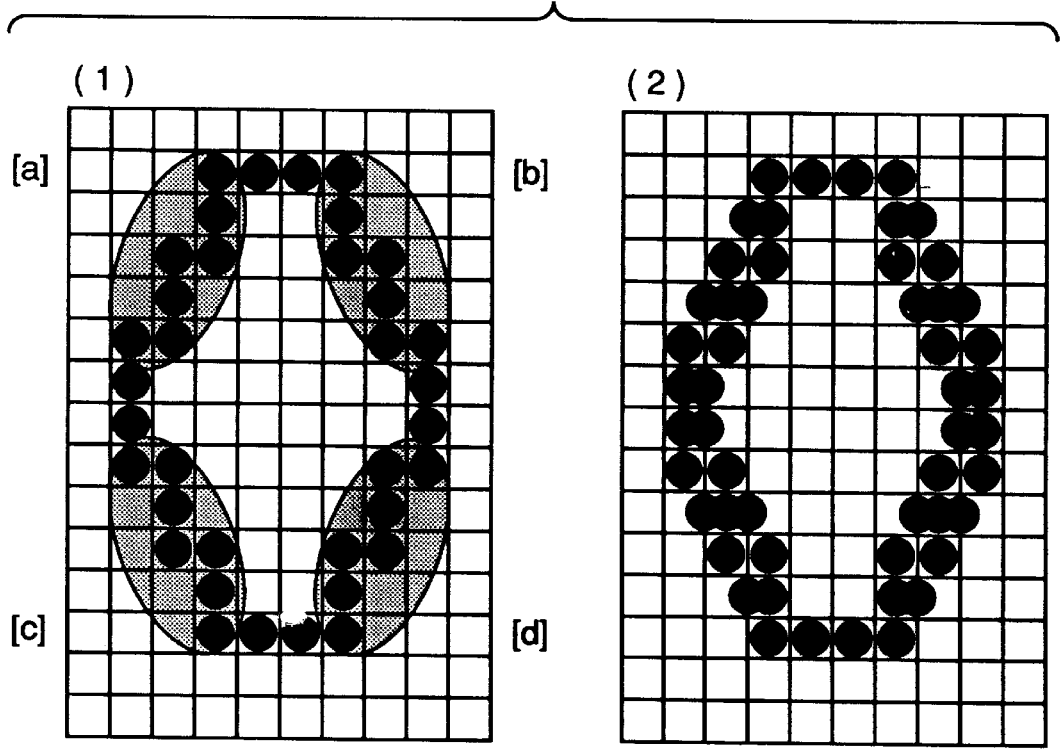
Figure 36:
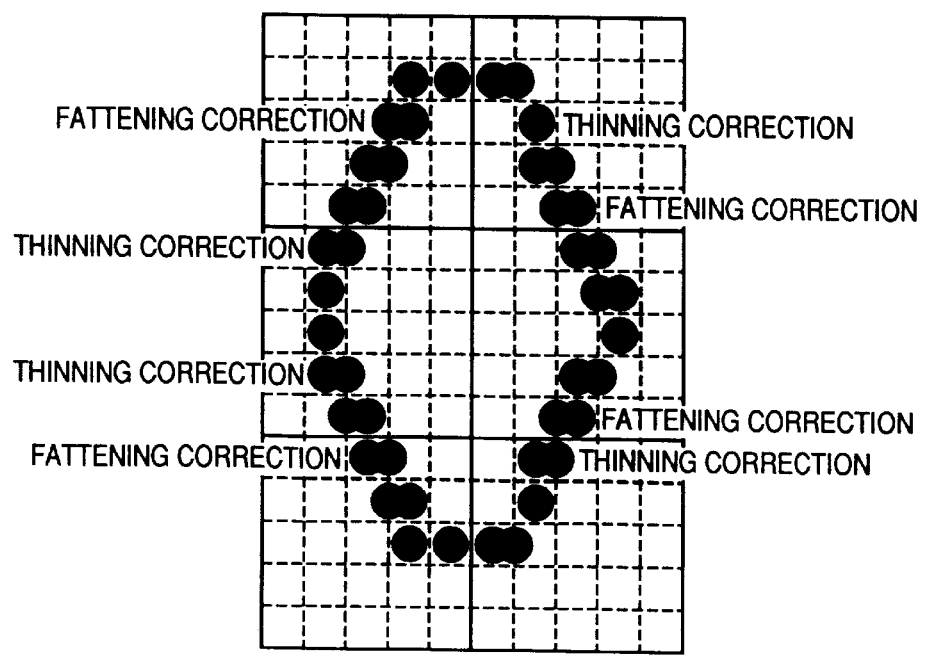

An image after the smoothing correction applied to the edges in FIG. 20 having dots of interest is shown in FIG. 34. The number and positions of added dots are determined by using the table as described above with reference to FIG. 33.

According to the seventh embodiment as described above, corners of the original image are determined, numbers of consecutive black dots in the X- and Y-directions are counted by using logic operation, then the table is accessed depending upon the determined results, and the smoothing correction is performed on the edges composed of a plurality of pixels. Therefore, it is possible to efficiently operate the high speed smoothing correction, which is composed of simple processes, and thus an image of high quality will be produced.

As for the typical structure and principle in the first to seventh embodiments, it is preferable that the basic structure disclosed in, for example, U.S. Pat. No. 4,723,129 or 4,740, 796 be employed. The aforesaid method can be adapted to both a so-called on-demand type apparatus and a continuous type apparatus. In particular, an advantage can be obtained when the on-demand type apparatus is employed because the structure is arranged in such a manner that one or more drive signals, which rapidly raise the temperature of an electricity-to-heat converter, disposed to face a sheet or a fluid passage which holds the fluid (ink) to a level higher than levels at which nucleate boiling takes place, and to affect the heat effecting surface of the recording head such that fluid boiling occurs so that bubbles can be formed in the fluid (ink) in correspondence with the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred advantage to be obtained because the fluid (ink) can be discharged while attaining excellent responsiveness.

It is preferable that a pulse drive signal disclosed in U.S. Pat. No. 4,463,359 or 4,345,262 be employed. If conditions disclosed in U.S. Pat. No. 4,313,124, which describes an invention relating to the temperature rising ratio at the heat effecting surface, are employed, a satisfactory print result can be obtained.

As an alternative to the structure (linear fluid passage or perpendicular fluid passage) of the recording head disclosed in each of the aforesaid inventions and having an arrangement where discharge ports, fluid passages and electricity-to-heat converters are combined, a structure having an arrangement where the heat effecting surface is disposed in a bent region, disclosed in U.S. Pat. No. 4,558,333 or U.S. Pat. No. 4,459,600, may be employed. In addition, the following structures may be employed: a structure having an arrangement where a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a record medium which can be recorded by the printing apparatus, either the construction which covers its width using a combination of a plurality of recording heads as disclosed above or the construction of a single full-line type recording head which has integrally been formed, can be used.

In addition, the invention is effective for a recording head of the freely exchangeable chip type which enables electrical connection to the printing apparatus main body or supply of ink from the main device by being mounted onto the apparatus main body, or for a case using a recording head of the cartridge type provided integrally with the recording head.

It is preferred additionally to employ a recording head restoring means and an auxiliary means provided as the component of the present invention because the advantage of the present invention can be further emphasized. Specifically, it is preferable to employ a recording head capping means, a cleaning means, a pressurizing or suction means, an electricity-to-heat converter, and another heating element or a sub-heating means constituted by their combination and a sub-emitting mode in which an emission is performed independently from the printing in order to stably perform the printing operation.

Further, as to a recording mode employed in the printing apparatus, recording can be performed not only with one color, such as black, but also with different colors either printed separately or mixed, by using an integrated recording head for color printing or using a plurality of heads.

Although a fluid ink is employed in the aforesaid embodiment of the present invention, ink which solidifies at room temperature, ink in the form of a fluid at room temperature, or an ink which is formed into a fluid when the print signal is supplied may be employed because the aforementioned ink-jet method is ordinarily arranged in such a manner that the temperature of ink is controlled in a range from 30° C. or higher to 70° C. or lower so as to have the viscosity of the ink within a stable discharge range.

Furthermore, ink of the following types can be adapted to the present invention: ink which liquefies when heat energy is supplied in response to the print signal so as to be discharged in the form of fluid ink, the aforementioned ink being exemplified by ink, the temperature rise of which due to supply of the heat energy is positively prevented by utilizing the temperature rise as energy of state change from the solid state to the liquid state; and ink which solidifies when it is allowed to stand, the purpose is for preventing ink evaporation. Furthermore, ink which first liquefies when supplied with heat energy may be adapted to the present invention. In the aforementioned case, the ink may be of a type which is held as fluid or solid material in a recess of a porous sheet or a through hole at a position facing the electricity-to-heat converter as disclosed in Japanese Patent Laid-Open No. 54-56847 or Japanese Patent Laid-Open No. 60-71260. This is the most preferred way for ink to be adapted to the aforementioned film boiling method.

In addition, the printing apparatus can be utilized as an image output terminal of an information processing apparatus, such as word processors and computers, mounted integrally or separately, further utilized as a copy apparatus which is combined with a reader or the like, or as a facsimile apparatus having transmitting/receiving functions.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

input means for inputting binary image data indicative of an on or off state of a dot;

first edge determining means for determining an edge corner in the inputted binary image data;

second edge determining means for determining a number, x, of consecutive black dots in the horizontal direction and a number, y, of consecutive black dots in the vertical direction of the edge corner determined by said first edge determining means; and smoothing means for performing smoothing correction on stair-like notches formed by edge portions of the inputted binary image data in accordance with a shape of the edge corner determined by the numbers x and y which are determined by said second edge determining means, wherein said first edge determining means determines the edge corner by performing a logic operation employing the inputted binary image data.

2. The image processing apparatus according to claim 1, wherein said first edge determining means determines the corner by logic operation.

3. The image processing apparatus according to claim 1, wherein said smoothing means performs the smoothing operation by accessing to a table on the basis of the values of x and y.

4. The image processing apparatus according to claim 1, wherein said smoothing means comprises dot adding means for controlling addition of dots, dot moving means for controlling displacement of dots, and dot eliminating means for controlling elimination of dots.

5. The image processing apparatus according to claim 1, wherein data after smoothing correction by said smoothing means is of a higher resolution than the inputted image data.

6. An image processing apparatus comprising:

input means for inputting binary image data indicative of an on or off state of a dot;

determining means for determining edges in the inputted binary image data;

smoothing means for smoothing stair-like notches formed by the edges determined by said determining means by applying a thinning process and a thickening process; and dot count determining means for determining a number, x, of consecutive black dots in the horizontal direction and a number, y, of consecutive black dots in the vertical direction on a corner of the determined edge, wherein said smoothing means performs smoothing correction on the basis of the determined numbers x and y, wherein said smoothing means controls positions where either the thinning or the thickening process is applied depending on a direction of the edge, and wherein said determining means determines the edges by performing a logic operation employing the inputted binary image data.

7. An image processing method comprising:

an input step of inputting binary image data indicative of an on or off state of a dot;

a first determining step of determining an edge corner in the inputted binary image data;

a second determining step of determining a number, x, of consecutive black dots in the horizontal direction and a number, y, of consecutive black dots in the vertical direction of the edge corner determined in said first determining step; and a smoothing step of performing smoothing correction on stair-like notches formed by edge portions of the inputted binary image data in accordance with a shape of the edge corner determined by the numbers x and y which are determined in said second determining step, wherein, in said first determining step, the inputted binary image data is compared with a pattern, stored in advance, representing an edge corner by a small area, and whether or not the small area in the input binary image data is at the edge corner is determined.

8. An image processing method comprising:

inputting binary image data indicative of an on or off state of a dot;

determining edges in the inputted binary image data;

smoothing stair-like notches formed by the edges determined in said determining step by applying a thinning process and a thickening process; and determining a number, x, of consecutive black dots in the horizontal direction and a number, y, of consecutive black dots in the vertical direction on the corner of the determined edge, wherein said smoothing step is performed on the basis of the determined numbers x and y, wherein, in said smoothing step, positions where either the thinning or the thickening process is applied are controlled depending on a direction of the edge, and wherein, in said determining step, the inputted binary image data is compared with a pattern, stored in advance, representing an edge by a small area, and whether or not the small area in the input binary image data is the edge is determined.

9. An image processing apparatus comprising:

input means for inputting image data;

first edge determining means for determining an edge corner in the inputted image data;

second edge determining means for determining a number, x, of consecutive black dots in the horizontal direction and a number, y, of consecutive black dots in the vertical direction of the edge corner determined by said first edge determining means;

smoothing means for performing smoothing correction on stair-like notches formed by edge portions of the inputted image data in accordance with a shape of the edge corner determined by the numbers x and y which are determined by said second edge determining means;

judging means for judging whether or not a dot next to the consecutive black dots is a white dot or a black dot; and inhibiting means for inhibiting the smoothing correction by said smoothing means when it is determined by said judging means that the dot next to the consecutive black dots is black.

10. An image processing method comprising:

an input step of inputting image data;

a first determining step of determining an edge corner in the inputted image data;

a second determining step of determining a number, x, of consecutive black dots in the horizontal direction and a number, y, of consecutive black dots in the vertical direction of the edge corner determined in said first determining step;

a smoothing step of performing smoothing correction on stair-like notches formed by edge portions of the inputted image data in accordance with a shape of the edge corner determined by the numbers x and y which are determined in said second determining step;

a judging step of judging whether or not a dot next to the consecutive black dots is a white dot or a black dot; and an inhibiting step of inhibiting the smoothing correction in said smoothing step when it is determined in said judging step that the dot next to the consecutive black dots is black.

* * * * *

UNITED STATES PATENT AND TRADEMARK OFFICE
CERTIFICATE OF CORRECTION

PATENT NO.   : 6,075,894
DATED        : June 13, 2000
INVENTOR(S)  : KENTARO YANO ET AL.

Page 1 of 2

It is certified that error appears in the above-identified patent and that said Letters Patent is hereby corrected as shown below:

ON THE COVER PAGE:

COLUMN [56]:

In References Cited, under U.S. PATENT DOCUMENTS, "Ueda etal." should read --Ueda et al.--.

COLUMN 1

Line 13, "fast" should read --quickly--.

COLUMN 2

Line 55, "*4)," should read --x4),--.

COLUMN 3

Line 4, "pattern" should read --patterns--.

COLUMN 11

Line 5, "fast." should read --quickly.--.

COLUMN 16

Line 11, "a" (second and fourth occurrences) should read --an--; and
Line 12, "a" should read --an--.

UNITED STATES PATENT AND TRADEMARK OFFICE
CERTIFICATE OF CORRECTION

PATENT NO. : 6,075,894

DATED : June 13, 2000

INVENTOR(S) : KENTARO YANO ET AL.

It is certified that error appears in the above-identified patent and that said Letters Patent is hereby corrected as shown below:

COLUMN 18

Line 8, "full line" should read --full-line--.

COLUMN 19

Line 38, "to" should be deleted.

Signed and Sealed this

Twenty-second Day of May, 2001

Attest:

NICHOLAS P. GODICI

Attesting Officer

Acting Director of the United States Patent and Trademark Office